US012656278B2

(12) United States Patent
Poulsen et al.

(10) Patent No.: US 12,656,278 B2
(45) Date of Patent: Jun. 16, 2026

(54) X-RAY DIFFRACTION METHOD FOR THE ANALYSIS OF AMORPHOUS AND SEMI-CRYSTALLINE MATERIALS

(71) Applicant: DANMARKS TEKNISKE UNIVERSITET, Kongens Lyngby (DK)

(72) Inventors: Henning Friis Poulsen, Kongens Lyngby (DK); Ulrik Lund Olsen, Kongens Lyngby (DK)

(73) Assignee: DANMARKS TEKNISKE UNIVERSITET, Kongens Lyngby (DK)

( * ) Notice: Subject to any disclaimer, the term of this patent is extended or adjusted under 35 U.S.C. 154(b) by 108 days.

(21) Appl. No.: 18/008,528

(22) PCT Filed: Jun. 7, 2021

(86) PCT No.: PCT/EP2021/065161
§ 371 (c)(1),
(2) Date: Dec. 6, 2022

(87) PCT Pub. No.: WO2021/249940
PCT Pub. Date: Dec. 16, 2021

(65) Prior Publication Data
US 2024/0068966 A1 Feb. 29, 2024

(30) Foreign Application Priority Data
Jun. 8, 2020 (EP) .................................... 20178748

(51) Int. Cl.
*G01N 23/207* (2018.01)

(52) U.S. Cl.
CPC ..... *G01N 23/207* (2013.01); *G01N 2223/316* (2013.01); *G01N 2223/623* (2013.01)

(58) Field of Classification Search
CPC ........... G01N 23/207; G01N 2223/316; G01N 2223/623; G01N 2223/0563; G01N 2223/607
See application file for complete search history.

(56) References Cited

U.S. PATENT DOCUMENTS 7,519,154 B2    4/2009   Harding
2013/0243159 A1 *  9/2013  Beckers ............... G01N 23/207
                                                           378/71
(Continued)

FOREIGN PATENT DOCUMENTS

CN      109141706 B    9/2020
EP        1468276 B1    9/2009
(Continued)

OTHER PUBLICATIONS

Stoclet, Grégory, et al. "WAXS study of the structural reorganization of semi-crystalline polylactide under tensile drawing." Polymer 53.2 (2012): 519-528. (Year: 2012).*
(Continued)

*Primary Examiner* — Edwin C Gunberg
*Assistant Examiner* — Richard O Toohey
(74) *Attorney, Agent, or Firm* — Dinsmore & Shohl LLP

(57) ABSTRACT

A method and apparatus for X-ray diffraction analysis of amorphous and/or semi-crystalline materials is able to provide the internal strain map of at least the exposed region of the material, even in the amorphous regions of the material. This is achieved in part by providing several unique and novel analysis methods that are able to extract material properties of semi-crystalline and amorphous materials based on the amorphous diffraction signal. The ability to analyse the amorphous diffraction signal is further facilitated by the use of one or more state-of-the-art energy dispersive detectors, which the inventors have found especially suitable for this purpose. This further allows the use of a polychro- (Continued)

matic X-ray source as opposed to the monochromatic X-ray sources typically encountered in X-ray diffraction experiments.

21 Claims, 17 Drawing Sheets

(56)                    References Cited

U.S. PATENT DOCUMENTS

| | | | |
|---|---|---|---|
| 2019/0094158 A1 | 3/2019 | Sunder | |
| 2020/0041427 A1* | 2/2020 | Mayo | ............... G01N 23/20091 |

FOREIGN PATENT DOCUMENTS

| | | |
|---|---|---|
| EP | 3425378 B1 | 12/2019 |
| JP | 2005534927 A | 11/2005 |
| JP | 2019007960 A | 1/2019 |

OTHER PUBLICATIONS

Croft, M., et al. "Strain profiling of fatigue crack overload effects using energy dispersive X-ray diffraction." International Journal of Fatigue 27.10-12 (2005): 1408-1419. (Year: 2005).*

Baker, John R., Thomas F. Budinger, and Ronald H. Huesman. "Generalized approach to inverse problems in tomography: Image reconstruction for spatially variant systems using natural pixels." High-Performance Computing in Biomedical Research (1993) (Year: 1993).*

Lionheart, William RB, and Philip J. Withers. "Diffraction tomography of strain." Inverse Problems 31.4 (2015): 045005. (Year: 2015).*

Bleuet et al.: Probing the structure of heterogeneous diluted materials by diffraction tomography, Nature Materials, vol. 7, No. 6, pp. 468-472, ISSN: 1476-1122, Apr. 20, 2008.

Cozzini et al.: "Energy dispersive X-ray diffraction spectral resolution considerations for security screening applications", Nuclear Science symposium Conference Record (NSS/MIC), ISBN: 978-1-4244-9105-6/10/$26.00, pp. 3873-3876, Oct. 30, 2010.

Guse et al.: "Temperature-dependent structure of liquid water investigated by means ofenergy-dispersive x-ray diffraction and molecular dynamics simulations", Journal of Physics, vol. 22 No. 32, Jul. 16, 2010 ISSN:0953-8984.

H.F. Poulsen et al.: "Measuring strain distributions in amorphous materials", Nature Materials vol. 4, DOI: 10.1038/nmat1266, Dec. 19, 2004.

H.F. Poulsen et al.: "A multiple length scale description of the mechanism of elastomer stretching", RSC Adv., 2016, 6, 95910, www.rsc.org/advances, DOI: 10.1039/c6ra22802j, Oct. 1, 2016.

Stoclet, G., et al., "Strain-Induced Molecular Ordering in Polylactide upon Uniaxial Stretching," Macromelecules, vol. 43, No. 3, 2010, pp. 1488-1498, DOI: 10.1021/ma9024366.

* cited by examiner

Beamstop

X-RAY DIFFRACTION METHOD FOR THE ANALYSIS OF AMORPHOUS AND SEMI-CRYSTALLINE MATERIALS

CROSS-REFERENCE TO RELATED APPLICATIONS

This application is the U.S. National Stage of PCT/EP2021/065161 filed on Jun. 7, 2021, which claims priority to European Patent Application 20178748.8 filed on Jun. 8, 2020, the entire content of both are incorporated herein by reference in their entirety.

FIELD OF THE INVENTION

The present disclosure relates to the field of X-ray diffraction, in particular it relates to a method and apparatus for X-ray diffraction analysis of amorphous and/or semi-crystalline materials.

BACKGROUND OF THE INVENTION

Since the 1920s, X-ray diffraction has been the principal method for determining the arrangement of atoms in minerals and metals. X-ray diffraction probes interatomic distances. For crystalline materials, the variations in interatomic distances represent the elastic strain on larger length scales, which are relevant when assessing the material strength. In the elastic regime, the relation between stress and strain is given by the generalized Hooke's Law, which states that the strain (deformation) of an elastic object or material is proportional to the stress applied to it. Measurements of multiple projections and coupling with X-ray imaging principles may result in maps of all six components of the strain tensor.

Mapping the elastic strain in 1 D, 2D or 3D is of importance, since the mechanical failure of products generally happens in regions of large strain. The macroscopic strain is directly observable from the surface of the material and can be done with other tools. It is restricted to be an average of the behaviour through the bulk of the sample and very local behaviour in the skin region. Therefore, it is of higher interest to map the microscopic strain of the material. Microscopic strain is the elongation of the atomic structure relative to a zero strain condition. The atomic structure consists of both intra chain bonds within a single molecule, and inter chain bonds between molecules. The intra chain bonds are typically shorter and stronger. The microscopic strain implies that build-in stresses exist in the material since each bond have a preferred length whereby forces are required to either elongate or compress the bonds away from equilibrium.

Strain can be induced in products during the manufacturing process or during use. The interest from the industry is often to map the internal stresses imposed during fabrication. An internal stress can influence the atomic structure is two ways: Firstly, the bonds in the direction of the stress is elongated and bonds perpendicular to the stress is compressed (for positive Poisson's ratios which is most common). Secondly, molecules rotate to accommodate the stress, i.e. the molecules orient themselves to have the bonds with the lowest strength in the direction with the highest stress. It is therefore of interest to map the distribution of stress/strain in products during the design process and/or in the quality assurance of the fabrication and/or during wear. In general, the relation between stress and strain is given by Hooke's law. Hence, the internal stress can be inferred from the internal strain and vice versa.

However, not all materials are crystalline. As an example, most polymers are semi-crystalline or amorphous. Examples of semi-crystalline polymers are linear polyethylene (PE), polyethylene terephthalate (PET), polytetrafluoroethylene (PTFE) or isotactic polypropylene (PP). Crystallization of polymers is a process associated with partial alignment of their molecular chains. The fraction of the ordered molecular chains in the polymer is characterized by the degree of crystallinity. Polymers can crystallize upon cooling from melting, mechanical stretching or solvent evaporation, and the crystallization typically affects the optical, mechanical, thermal and/or chemical properties of the polymer.

As of now, methods for determining the strain map similar to those for crystalline materials do not exist for polymers. Some information may be obtained from surface analysis or by means of destructive methods such as by drilling holes. For all existing methods, however, obtaining a complete spatially resolved strain map is not possible. Hence, there is a need for improved methods that may enable determining the entire strain map of a polymer.

Up until now, the X-ray diffraction signal obtained from amorphous materials or amorphous regions of semi-crystalline materials has not been considered adequate for providing strain maps with the precision required for determining the internal strain of the material. In prior art studies, only the strain of the crystalline phase of semi-crystalline materials has been considered, and the response of the amorphous phase of the materials has typically been inferred from model interpretation.

Hence, there is a need of improved methods and analysis tools that are able to determine the elastic strain of amorphous materials and/or or amorphous regions of semi-crystalline materials based on the diffraction signal obtained from the material. Furthermore, there is a need of an apparatus capable of providing an experimental platform for carrying out said methods.

SUMMARY OF THE INVENTION

The present disclosure addresses the above-mentioned needs by providing a method and apparatus for X-ray diffraction analysis of amorphous and/or semi-crystalline materials, said method being able to provide the internal strain map of at least the exposed region of the material, even in the amorphous regions of the material.

This is, among other things, achieved by providing several unique and novel analysis methods that are able to extract material properties of semi-crystalline and amorphous materials based on the diffraction signal from the sample. Previous efforts have deemed the diffraction signal from amorphous regions too broad or too weak to use as the basis for the analysis of materials properties of the investigated material. Nevertheless, the inventors have realised that material properties (e.g. the internal strain) of amorphous materials or of amorphous regions of semi-crystalline materials may be determined by the use of the presently disclosed apparatus and method. The ability to analyse the diffraction signal from amorphous regions is further facilitated by the use of one or more state-of-the-art energy dispersive detectors, which the inventors have found especially suitable for this purpose. This further allows the use of a polychromatic X-ray source as opposed to the monochromatic X-ray sources typically encountered in X-ray diffraction experiments.

Typically, X-ray diffraction is used to investigate crystalline materials since the crystallinity of the material gives rise to diffraction patterns having distinct and sharp peaks from which material properties such as the lattice constant may be inferred. On the contrary, the diffraction signal from amorphous materials, or from amorphous regions in semi-crystalline materials, is broader and weaker than that obtained from crystalline regions or crystalline materials. Consequently, until now it has not been possible to determine the molecular structure or the internal strain of e.g. semi-crystalline polymers based on the amorphous X-ray diffraction signal. However, by using the apparatus and method described herein, it is possible to obtain information related to the material properties of an amorphous or semi-crystalline material, such as the internal strain of a semi-crystalline polymer, or of biological tissue such as transplants and muscles.

Accordingly, the present disclosure relates to an X-ray diffraction method for the analysis of amorphous and/or semi-crystalline materials, the method comprising the steps of: providing a sample, wherein the sample is a semi-crystalline material or an amorphous material, said material comprising at least one amorphous region; providing a polychromatic X-ray source; collimating X-rays from the X-ray source into one or more pencil beams; exposing at least a region of the sample to the one or more pencil beams, whereby the beam(s) is/are diffracted; collecting at least some of the diffracted beams in one or more energy dispersive 2D detectors to obtain one or more diffraction images; and analysing the obtained diffraction image(s) to determine the internal strain and/or stress in at least the exposed region of the sample, wherein said analysis comprises the step of analysing the diffraction signal from the amorphous region of the sample. Any of the steps in the method may optionally be repeated to obtain one or more diffraction images from different regions of the sample or at different conditions of the sample. Furthermore, the steps of providing the sample and the X-ray source may be executed in any order. The different conditions may relate to the conditions in the environment of the sample such as the temperature and/or the humidity of the surroundings, or gasses introduced into the environment of the sample. The conditions of the sample may also relate to an external strain imposed on the sample.

The internal strain of the sample may be extracted from the diffraction images in multiple ways according to the presently disclosed method. Typically, for all disclosed analysis methods, a characteristic pattern is obtained (e.g. similar to the one shown in FIG. 7). As an example, the pattern may display the intensity of the diffraction signal versus the Q-value. For a crystalline sample, this pattern comprises one or more sharp intensity peaks. For a semi-crystalline sample or an amorphous sample, the peaks will typically be broader compared to the peaks of the crystalline sample (see FIG. 8, which displays data from an amorphous sample). The entire pattern can be ascribed a radial position, which is determined (alternatively, the position of one or more intensity peaks in the pattern is determined, e.g. the first and/or second diffraction peak). This position directly correlates with the length of the bonds in the sample. In some cases, the length of an unstrained bond of the sample material is known a-priori. In such cases, the strain is directly found by comparing the radial position of the pattern to the unstrained bond-length. In other cases, the method and analysis is carried out on multiple sub-volumes of the sample, wherein the position of the characteristic pattern is noted for each sub-volume. By comparing the position obtained for different volumes, it is possible to identify volumes in the sample, wherein the strain is significantly higher or lower than the rest of the sample.

Accordingly, the presently disclosed method does not rely on imposing an external strain to the sample in order to assess the internal strain. On the contrary, the applicant has found that the position of intensity peaks (e.g. the first diffraction peak and/or the second diffraction peak, etc.) in the characteristic pattern (e.g. the ones displayed in FIGS. 7 and 8) can be used to infer the internal strain (magnitude and/or orientation). This can be done from a single measurement, i.e. a single diffraction image. FIG. 9 displays how the position of the peak(s) differ among different levels of strain (the graph shows different curves for different values of strain, wherein the curve of the unstrained case has been subtracted from each curve in order to obtain a difference signal). Even though the method works for a single diffraction image, the applicant has performed a series of experiments, wherein the internal strain was varied (by imposing an external strain on the sample) in order to verify the disclosed method.

According to another analysis method, the azimuthal distribution of the diffraction signal is resolved. The 1D diffraction pattern from orthogonal azimuthal angles originates from orthogonal bonds in the sample. The combined internal strain in 3 dimensions can be decomposed into a strain tensor of 9 components with symmetry for 6 components. These components can be calculated from the azimuthal distribution of pattern position. Hence, a first part of the analysis method may comprise the step of determining the radial position of the characteristic pattern obtained from the diffraction signal, since this position correlates with the bond length in the sample.

A second part of the analysis method relates to determining the intensity of the characteristic pattern(s). As an example, this could be achieved by determining the height of the peak(s) in the pattern(s), but it could also be achieved by determining the area of the pattern, e.g. by integration. The intensity distribution is correlated to the scatter cross section of the material, i.e. how well the material scatters photons, and the density of bonds corresponding to that specific pattern. By finding the azimuthal distribution of intensity, it is thus possible to find the angular distribution of bonds. For the interaction volume of each of the measurements, the angular distribution is in most cases isotropic in the unstrained case. An anisotropic distribution is thus indicative of internal strain.

Amorphous regions consist of molecules of the same atomic structure as the crystalline regions, but the distance of ordered molecules is smaller i.e. the molecules are not aligned similarly to each other in any significant region. Even if the molecules are not ordered in the same structure, they are still connected with molecular bonds. The bonds are typically observed to vary in length, since the structure is not consistent. On the other hand, the molecules are not completely randomly distributed so it is possible to obtain a bond length from a 1D diffraction pattern obtained from an amorphous region. However, the bond length obtained will typically be associated with a greater uncertainty compared to a crystalline region.

All of the analysis methods disclosed herein can be employed in the above disclosed method for the analysis of semi-crystalline materials.

The present disclosure further relates to an apparatus for X-ray diffraction analysis of semi-crystalline materials, the apparatus comprising: a polychromatic X-ray source; a collimator configured for collimating X-rays from the polychromatic X-ray source into one or more pencil beams; a stage for holding a sample; and one or more energy dispersive X-ray detectors. The apparatus may further comprise an optical element configured for displacement along the optical axis 6 of the apparatus in order to provide depth information of the sample. The apparatus is preferably configured such that any of the X-ray diffraction methods for the analysis of semi-crystalline materials as disclosed herein may be performed using said apparatus.

The present disclosure further relates to a computer-implemented method for analysing X-ray diffraction images of amorphous and/or semi-crystalline materials, the method comprising the steps of: providing a plurality of X-ray diffraction images obtained from a semi-crystalline sample; optionally extracting one or more 1D diffraction patterns from said diffraction images; determining the position of one or more intensity peaks in the diffraction images and/or in the 1D diffraction patterns; comparing said position(s) to similar intensity peaks obtained at a different strain level or obtained in another region of the sample, wherein the difference(s) between the position(s) of the peaks are computed; and determining the internal strain in at least one region of the sample based on said difference(s).

The analysis preferably considers the entire diffraction pattern, which may be formed from a diffraction signal from all phases of the material, i.e. both the amorphous and crystalline phases of the material. The presently disclosed analysis methods are preferably suitable for the analysis of both the amorphous and the crystalline phases of the material. The 1D pattern(s) are preferably determined for multiple orientations, and the difference(s) between orientations is the preferably subsequently analysed as a signature for strain and structure in the material.

The present disclosure further relates to a computer-implemented method for analysing X-ray diffraction images of amorphous and/or semi-crystalline materials, the method comprising the steps of: providing one or more X-ray diffraction images obtained from an amorphous and/or a semi-crystalline sample; extracting one or more azimuthal intensity distributions from said diffraction images; determining the position of one or more intensity peaks in the diffraction azimuthal intensity distributions, said position specified by an azimuthal angle; and determining the internal strain orientations and/or the internal strain levels of at least a region of the sample based on the position of said intensity peak(s).

The present disclosure further relates to a computer program having instructions thereon which when executed by a computing device or system causes the computing device or system to provide the analysis of an amorphous or semi-crystalline material by executing any of the computer-implemented methods for analysing X-ray diffraction images of semi-crystalline materials as disclosed herein.

DEFINITIONS

A 2D diffraction pattern is understood to be the diffraction image formed by collecting the diffracted signal on a 2D detector.

A 1D diffraction pattern is understood to be a 1D plot of the intensity of the diffracted signal collected at the detector. The intensity may be plotted versus any suitable parameter such as the scattering angle, the Q-value, the direct space parameter, or the azimuthal angle.

A strain map is understood to be a mathematical object with the same dimensions as the sample separated into smaller regions each corresponding to a volume in the sample. Each region is assigned a strain tensor according to the measurement of the respective part of the sample. Collectively the regions cover the entire volume of the sample.

The terms 2D diffraction pattern and diffraction image are used interchangeably.

The wording 'similar peaks' or 'similar intensity peaks' refers to one or more peaks, each peak being identified in at least two different diffraction patterns, wherein the location of said peaks are approximately the same among the at least two diffraction patterns.

A diffraction ring is understood to be an approximately circular ring or annulus in the diffraction image. In other words, the term 'diffraction ring' as used herein is not limited to a circularly shaped discrete line, but may refer to an annulus.

DETAILED DESCRIPTION OF THE INVENTION

The present disclosure relates to an apparatus and an X-ray diffraction method for the analysis of amorphous and/or semi-crystalline materials. The present disclosure further relates to a number of different analysis methods that may form part of the X-ray diffraction method described herein.

Apparatus

Figure 1A:
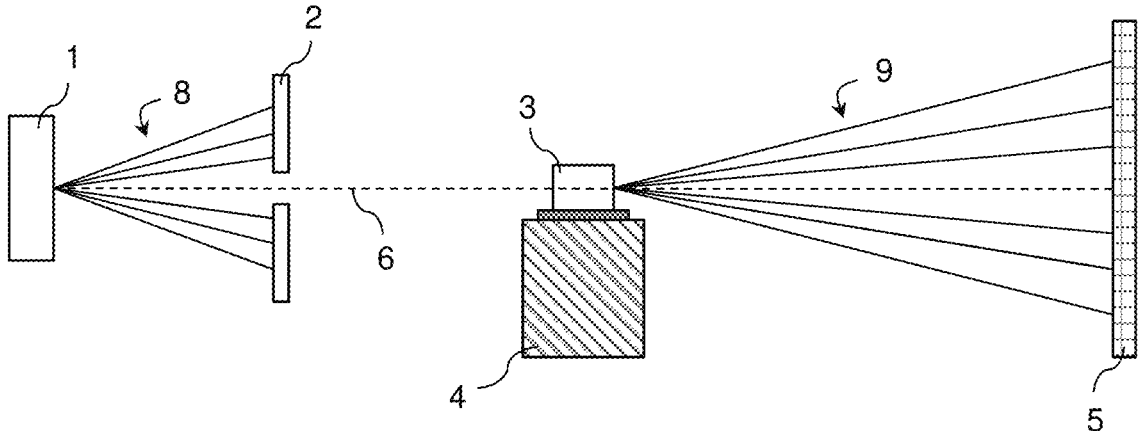
FIG. 1A shows a schematic of an apparatus for X-ray diffraction analysis according to the present disclosure.

The presently disclosed apparatus preferably comprises a polychromatic X-ray source 1 configured for emitting X-rays 8, a collimator 2 configured for collimating X-rays emitted from the source, a stage 4 for holding a sample 3, and one or more energy dispersive detectors 5. A schematic of the apparatus is shown in FIG. 1A. The apparatus described herein is suitable for facilitating the X-ray diffraction method according to the present disclosure, i.e. the apparatus is suitable for providing one or more diffraction images from a sample as specified herein. The diffraction images may then be analysed using a novel analysis method, which is described later.

The X-ray source 1 is preferably a polychromatic X-ray source. An example of a suitable X-ray source is a 160 kV, 1.8 kW industrial X-ray tube (W tube) by COMET Industrial X-Ray. The use of a polychromatic X-ray source lowers the cost of the apparatus, since a high-energy monochromatic X-ray source generally requires a synchrotron facility, which often entails a significant cost. The energy of the emitted X-rays from the source is typically in the range 1-100 keV depending on the thickness of the sample. The energy resolution will typically be in the order of $1\times10^{-2}$ depending on the energy used in the experiment.

The collimator 2 for collimating the X-rays from the source may be a collimator, a condenser, a slit, or combinations thereof. The purpose of the collimation is to collimate the X-rays from the X-ray source into one or more pencil beams, said pencil beams preferably being substantially parallel to the optical axis 6 of the apparatus.

The stage 4 for holding the sample 3 may be any platform suitable for this purpose. However, preferably, the stage comprises a goniometer that allows the sample to be rotated to a precise angular position. The stage may be an electro-mechanical goniometer stage. Preferably, the stage is further capable of providing a controlled environment e.g. in terms of temperature, humidity, etc.

Detectors

The energy dispersive detector(s) 5 used in the presently disclosed method and apparatus should be suitable for detecting X-rays hitting the detector. Typically, the X-rays emitted from the polychromatic X-ray source comprise a wide range of photon energies. Consequently, the intensity distributions of the diffracted signal associated with different scattering angles are associated with significant overlaps in the photon energies as evident from FIG. 5. The inventors have realised that by using one or more energy dispersive 2D detector(s), each being able to spectrally resolve the collected diffraction signal, said signal may be split into a plurality of energy bins. The use of energy bins is advantageous when analysing the obtained diffraction patterns, especially when combined with the use of Q-values that express the energies and scattering angles in a single number given by the equation below:

$$Q = \frac{4\pi}{\lambda}\sin\theta$$

By expressing the intensity distribution as a function of Q-values, one obtains a 1D diffraction pattern with a higher signal-to-noise ratio, which is thereby a better starting point for the analysis part of the method. In other words, the acquired diffraction signal is preferably reordered into 1D diffraction patterns resolved into the azimuthal angle they were collected from and their scattering vector Q. Accordingly, the detector(s) need to be able to determine the angle of the diffraction, the azimuthal angle and the wavelength (lambda) of the radiation. The wavelength can be determined by an energy sensitive component in the detector(s). The detector(s) need to provide 2-dimensional spatial resolution of the radiation in order to determine the two aforementioned angles. As an example, this can be achieved by a rectangular grid of pixels in the 2D detector(s). Alternatively, the grid of pixels can be arranged as a 2-dimensional polar coordinate system. In one embodiment, the energy dispersive detectors comprise a 2-dimensional grid of pixels, such as a rectangular grid or a polar grid. As an example, the 2D grid of pixels may be 256×256 pixels. It is of great advantage to use energy dispersive detector(s), since it allows the use of a polychromatic X-ray source. If the detector(s) was unable to resolve the energy of the photons, the energy would have to be known in other ways e.g. by using a monochromator or by using a monochromatic X-ray source such as a synchrotron. Similarly, if the detector was not able to resolve the spatial dimension (e.g. because it was a point detector), the spatial dimension needed to be obtained from another component such as a collimator.

Preferably, the detector comprises an array of energy dispersive detectors. Said array may comprise a plurality of detectors, such as two detectors, four detectors, or more than four detectors. Preferably, the sensitive area of the detector is large enough to cover the entire first-order diffraction ring. Even more preferably, the detector is large enough to cover both the first- and second-order diffraction rings. As an example, the apparatus may comprise four energy dispersive detectors arranged in an array (shown schematically in FIG. 19). Each detector may comprise a plurality of pixels defining the resolution. As an example, each detector may comprise 256×256 pixels. This is enough to span the entire diffraction ring corresponding to a 0.5% spatial resolution and approximately 2% energy resolution. Preferably, in case of multiple detectors arranged in an array, the detectors are arranged such that the center beam may pass through the array of detectors uninterrupted. This is due to the fact that the center beam is approximately 1000 times more powerful than the scattered beams from the sample, and if the center beam were to hit the detector, unwanted scattering might occur from the detector material. Hence, the detector or array of detectors may comprise an opening, said opening preferably aligned to coincide with the central beam and/or the optical axis 6 of the apparatus. Alternatively, the apparatus may comprise a beam stop configured for blocking the center beam, said beam stop placed on the optical axis 6 between the sample and the detector.

Preferably, the detector(s) used in the disclosed apparatus and method is configured to use very exact timing of the detected signal in order to determine simultaneously detection of signal in neighboring pixels. This makes it possible to correct for charge sharing weighing potential crosstalk and fluorescence peaks.

Optical Element

Figure 1B:
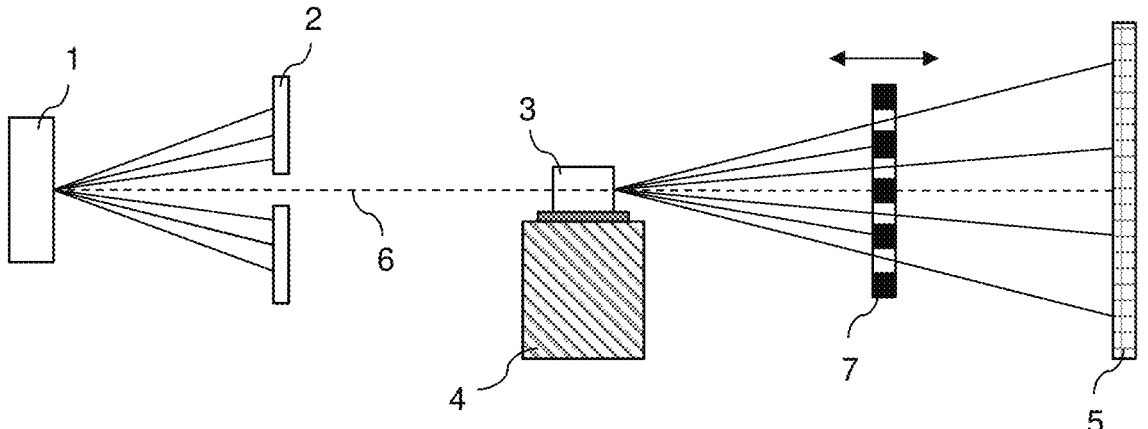
FIG. 1B shows a schematic of an apparatus for X-ray diffraction analysis according to the present disclosure, wherein an optical element has been placed in the beam path between the sample and the detector.

The apparatus may further comprise an optical element 7 configured for displacement along the optical axis 6. Such a configuration is shown in FIG. 1B. The optical element may comprise an optical mask configured for blocking a part of the diffracted X-rays 9 from the sample, said part of the diffracted X-rays having a scattering angle larger than 0°. In one embodiment, the optical element is circular symmetric, however other geometries can also be used. The blocked part of the diffracted X-rays may have a scattering angle of more than 0°, or more than 2°, or more than 5°, or more than 10°, or more than 20°, or more than 30°, or scattering angles larger than 40°. However, the scattering angles typically encountered using the presently disclosed apparatus and method are 2-70°, preferably 2-20°, or even more preferably 2-50°. Thus, whereas the beam stop is configured for blocking the center beam, the optical element as disclosed herein, is configured for blocking part of the diffraction pattern that otherwise would have occurred in the diffraction image on the detector. As an example, the mask pattern on the optical mask may comprise regions such as rings (shown as dark regions in FIG. 18), said regions configured to block X-rays of certain scattering angles depending on the position of the mask. In one embodiment, the optical element is configured to block approximately half of the radiation from the sample. The fact that it is not only a narrow angular range of the diffracted signal, which is allowed through, means that ambiguities exist about where each photon in the signal is originating from, and which angle it had (i.e. which angle the diffracted X-ray defined by the photons had). To resolve the ambiguities, several acquisitions need to be made, wherein each acquisition blocks different parts of the scattering cone and allow other parts to pass. The results is that the total acquisition gathers much more photons compared to existing techniques. The seeming loss of information by collecting from multiple angles and depths can be resolved in a reconstruction step and thus takes advantage of access to computational power.

Figure 20:
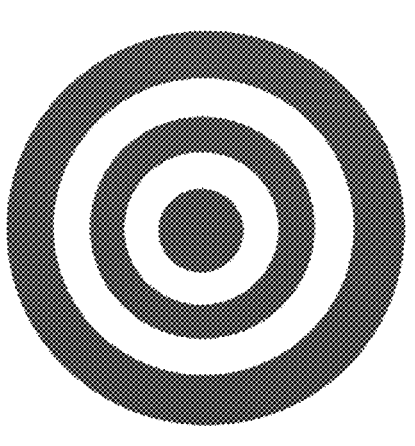
FIG. 20 shows a schematic of a mask design according to an embodiment of the optical element 7.

Therefore, in one embodiment the optical element is configured to be translated along the optical axis 6 between the sample and the detector. As the position of the optical element changes, X-rays of different scattering angles will be blocked by the optical element. Consequently, the diffraction pattern on the detector changes according to the position of the optical element. As an alternative to moving the optical element, other components of the apparatus (e.g. the detector(s) and/or the sample) may be moved (along the optical path or sideways). The important thing in this regard is that the detector acquires different parts of the scatter cone as the optical element (or one of the other components) is translated/moved. The variation in the radial intensity of the diffracted signal on the detector versus the position of the optical element is shown in FIG. 20. By translating the optical element through the diffracted signal from the sample and obtaining one or more diffraction images associated with each position of the optical element, the method enables spatial resolution in the dimension along the optical axis 6. FIG. 20 shows how the diffraction pattern change with the position of the optical element. For each position, the diffraction pattern at different angles are blocked by the optical element depending on which depth in the sample the pattern originate from. Each diffraction image comprise information from different volumes in the sample, so the images collectively comprise all the information from the sample but with the patterns from different depths overlapping each other.

Reconstruction

The instrument geometry in FIG. 1B can be described mathematically along with the position of the optical element. The description allows a mapping of a diffraction pattern from a specific depth of the sample to the pattern that will be acquired by the detector. Using an iterative approach, different distributions of diffraction patterns at different sample depths are evaluated. By comparing the modelled result with the acquired data, the most likely distribution of the diffraction patterns in the sample can be inferred. The reconstruction algorithm is thus able to find the solution that matches the signal in the acquisitions mathematically but preferably the algorithm also comprises physical models for the sample that constraints the possible solutions. As an example, the physical models can contain information about the material and the expected strain ranges.

Mathematically, the reconstruction algorithm solves the equation P=A x, where P is the acquired data, x represents a map of the sample, and A is a system matrix that describes how radiation from the source moves through the apparatus and is scattered by the sample blocked by the collimators and sensed by the detector. Solving such an inverse problem can be done in multiple ways, and is a similar problem encountered in tomography. The sample has 3 spatial dimensions and is associated with a vector that describes the scattering factor for each Q value. The scatter vector combines the scattering angle and the energy. Thus, the use of Q values reduces the number of extra dimensions in addition to the spatial dimension from 2 to 1. Finally, the azimuthal resolution is used to make the scatter factor two-dimensional, so both the scatter angle and the azimuthal angle is reconstructed. Mathematically, this implies that the sample map is 5-dimensional.

The depth resolution is a function of the open area of the optical element and the number of images acquired at different positions. The method is preferably able to increase either the speed of the acquisitions or the depth resolution for a sample for each measurement.

Accordingly, the apparatus may be configured for providing depth information of the sample, said configuration being achieved by including an optical element in the apparatus as explained herein.

The present disclosure further relates to an X-ray diffraction method for the analysis of amorphous and/or semi-crystalline materials such as polymers. The method preferably comprises the steps of a) providing a sample, wherein the sample is an amorphous or a semi-crystalline material; b) providing a polychromatic X-ray source; c) collimating X-rays from the X-ray source into one or more pencil beams; d) exposing at least a portion of the sample to the one or more pencil beams, whereby the beam(s) are diffracted; e) collecting at least some of the diffracted X-rays in one or more energy dispersive detectors to obtain one or more diffraction images; and f) analysing the obtained diffraction image(s) to map the internal strain and/or stress of at least a region of the sample. The disclosed method requires the obtainment of at least one diffraction image. However, multiple diffraction images may be acquired, such as at least two diffraction images, or at least three diffraction images, or a plurality of diffraction images.

Sample

The presently disclosed apparatus and method is able to analyse semi-crystalline materials, said materials comprising at least one amorphous region. Therefore, the sample 3 is preferably a semi-crystalline material or an amorphous material. The sample may comprise a semi-crystalline polymer such as linear polyethylene (PE), polyethylene terephthalate (PET), polybutylene terephthalate (PBT), polyether ether ketone (PEEK), polytetrafluoroethylene (PTFE) or isotactic polypropylene (PP). The degree of crystallinity of the semi-crystalline polymers of interest will typically range between 10% and 80%. The apparatus and method enable the determination of the elastic strain of the amorphous regions of said materials. Hence, it is possible using the presently disclosed apparatus and method to analyse semi-crystalline materials with a degree of crystallinity of less than 30%, even less than 20%. Accordingly, the presently disclosed apparatus and method is preferably suitable for analysing semi-crystalline materials, wherein the crystallinity of the analysed material is less than 20%. It is even possible to analyse the amorphous regions of a semi-crystalline material. Based on said analysis it is possible to determine the strain and/or the stress in at least a region of the sample comprising a semi-crystalline material, even when the analysis is based on the diffracted signal from amorphous regions in the sample. The determined strain/stress may be provided in the form of a strain map. The sample may be a thin film (2D) or it may be a 3-dimensional object. The sample may also be a biological sample such as human tissue, e.g. muscle tissue. The method may preferably be able to map muscle contractions at a myofibrillar level and provide localized stress-strain levels. Through small muscle samples obtained via biopsies in humans this can allow characterization of skeletal muscle in connection with rehabilitation, various diseases and physical training. The sample may also comprise an inorganic material such as glass or ceramic. These materials are increasingly used for advanced applications due to superior strength, biocompatibility and possibilities for tuning electrical functionality. The longevity of the component depends on the production avoiding introducing strains and stresses and the method may preferably be able to map these in fine detail.

Method

The method will now be explained in further detail. The sample 3 is placed on a stage 4 such that the optical axis 6 of the apparatus goes through at least a region of the sample. X-rays 8 are emitted from a polychromatic X-ray source 1, and the emitted X-rays 8 are collimated into one or more pencil beams by a collimator 2. The sample is exposed to the one or more pencil beams, whereby the beams are diffracted. The diffracted X-rays 9 appears as diffraction cones, each diffraction cone described by a specific scattering angle 2θ in accordance with diffraction theory. The diffraction cones appear as diffraction rings on a 2-dimensional area detector 5, said detector preferably being orthogonal to the optical axis 6. Consequently, the collected diffraction signal on the detector forms a diffraction image comprising one or more of said diffraction rings. A raw 2D diffraction pattern obtained on an energy dispersive detector can be seen in FIG. 2. The diffraction rings occur in semi-crystalline materials (or crystalline powders) due to a random orientation of the crystalline regions. Each diffraction ring of different scattering angle can be attributed to ordered regions having different lattice constants. As an example, a semi-crystalline polymer will comprise ordered regions, wherein the polymer chains are aligned with a separation distance denoted the lattice constant. One or more 1D diffraction patterns may be obtained from the 2D diffraction pattern. A 1D diffraction pattern comprises a graph of the intensity of the diffracted signal versus a relevant parameter such as the Q-value, the scattering angle or the direct distance of scattering centres. An example of a 1D diffraction pattern is shown in FIG. 6 and FIG. 7. One may also obtain an azimuthal intensity distribution that displays the intensity variation along the azimuth of a diffraction ring. Accordingly, the azimuthal intensity distribution is a 1D plot obtained from the 2D diffraction pattern. The present disclosure relates to several methods of analysing such diffraction patterns or azimuthal intensity distributions, and from said analysis inferring information of the sample, said information preferably comprising the strain and/or the stress in at least a region of the sample, such as a small volume of the sample. The various analysis methods that form part of the presently disclosed X-ray diffraction method are described below.

Analysis Methods

The analysis comprises the step of analysing one or more diffraction images or one or more 1D diffraction patterns obtained from the diffraction images. The diffraction images may be obtained using the presently disclosed method described elsewhere. The analysis may comprise the step of analysing one or more 1D diffraction patterns, wherein said diffraction patterns comprise an intensity distribution. The intensity distribution is a 1D plot of the intensity of the diffracted signal versus a parameter selected among the group of: scattering angle, wavelength, energy, the radial coordinate r, the azimuthal coordinate η, or the Q-value. The Q-value combines all of the first three parameters into a single number according to Bragg's law. The diffraction signal may alternatively be expressed in direct space, which may be achieved using a Fourier transformation. Rather than expressing the scattering properties, the direct space presentation directly shows how structures of different length contributes to the signal. For the direct space representation, the information from different energy bins of the detector can be collected for improved statistics.

The present disclosure relates to multiple analysis methods that may all form part of the presently disclosed X-ray diffraction method for the analysis of amorphous and/or semi-crystalline materials. At least one embodiment of the analysis method comprises the step of analysing the intensity distribution versus Q-value. Another embodiment comprises the step of analysing the azimuthal diffraction pattern, said analysis preferably further comprising determining the shift of one or more intensity peaks in the azimuthal diffraction pattern. The azimuthal diffraction pattern may be expressed in terms of the shift in Q-values versus the azimuthal coordinate η. The different embodiments will be explained in later detail below.

Figure 7:
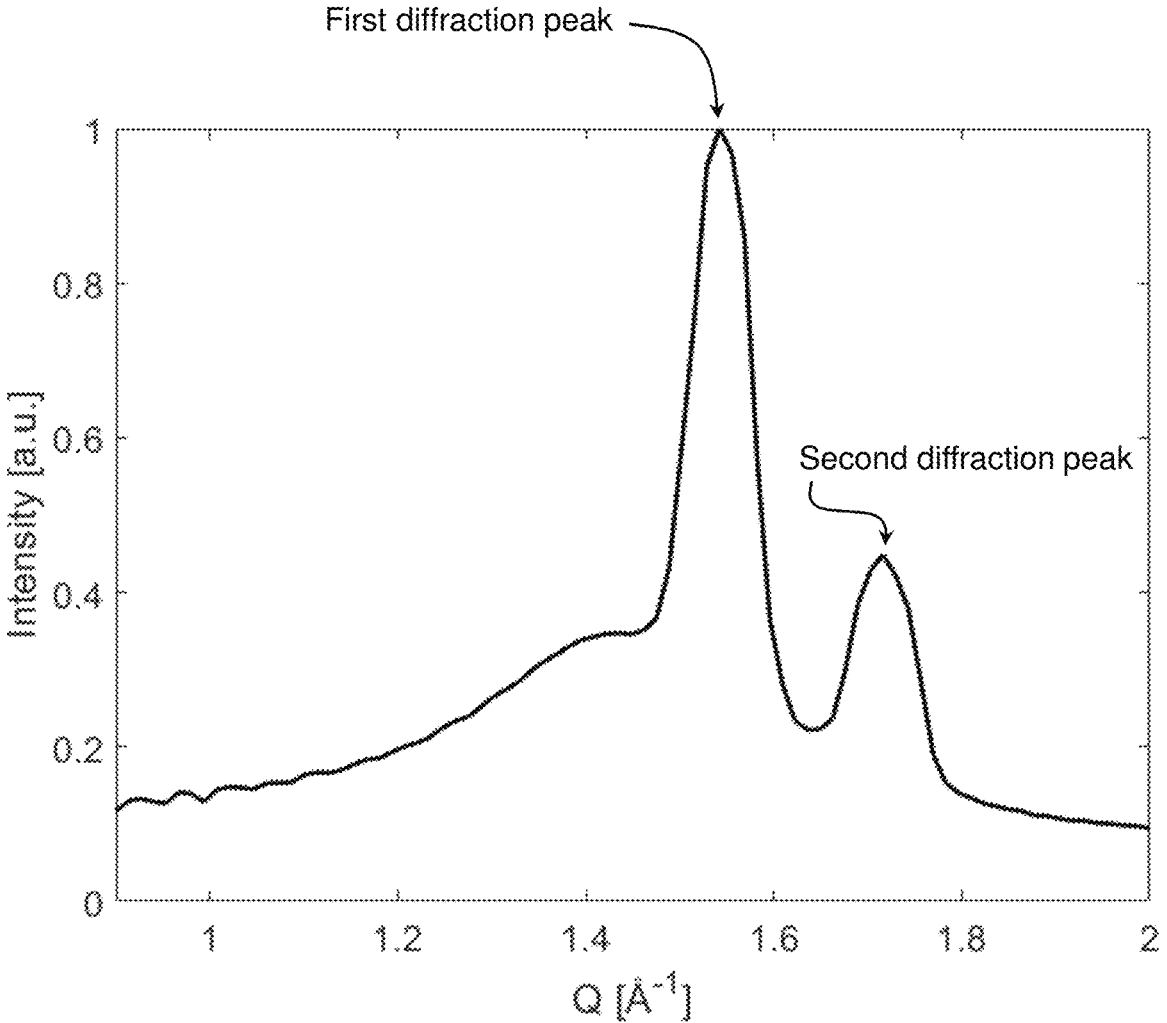
FIG. 7 shows the diffraction signal from a polyethylene (PE) sample. The plot shows a graph of the intensity of the signal versus the Q-value and indicate the numbering convention of the peaks in the diffraction pattern.
Figure 8:
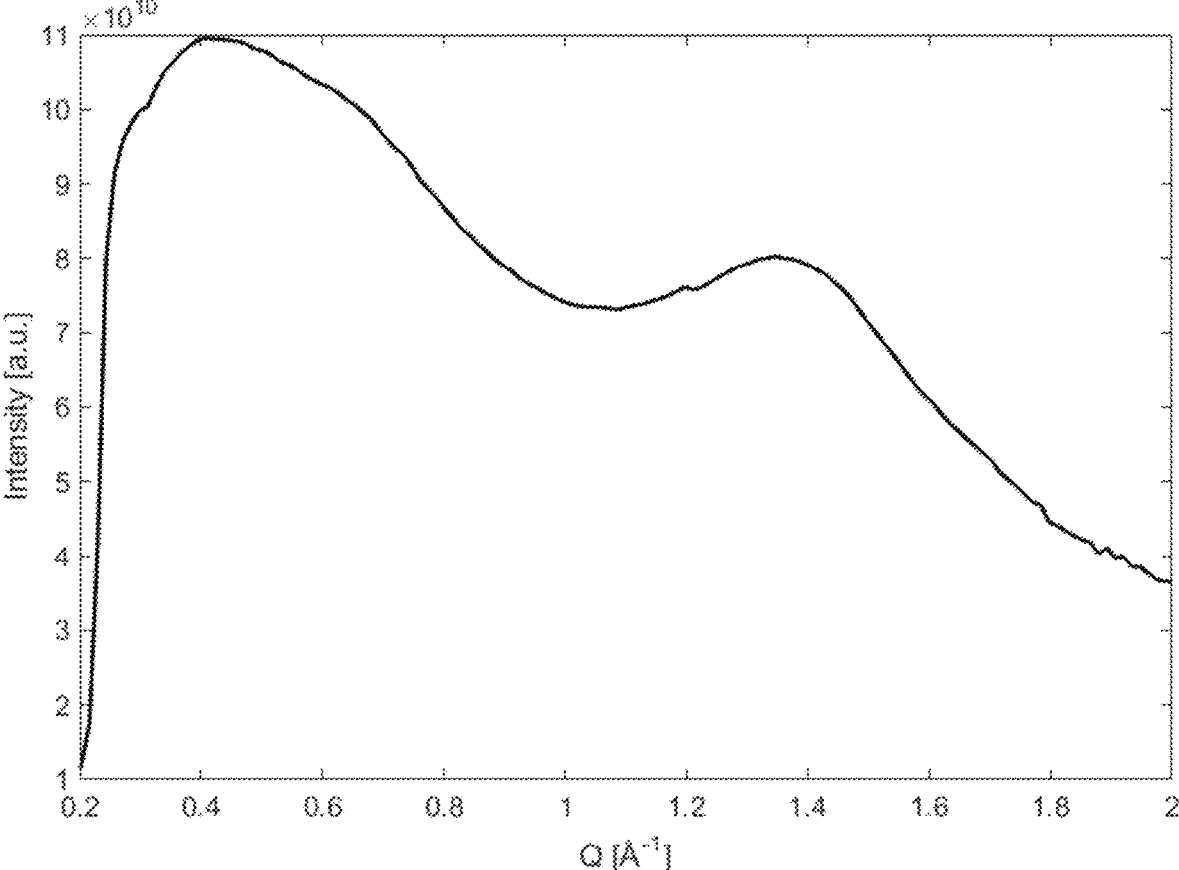
FIG. 8 shows the diffraction signal from an amorphous sample (atactic polystyrene). The plot shows a graph of the intensity of the signal versus the Q-value.

One embodiment of the analysis comprises the step of obtaining a 1D intensity distribution from the one or more diffraction images. In the following description, the intensity distribution is expressed in terms of the Q-value, but as will be understood to the person skilled-in-the-art similar results may be obtained using other of the parameters mentioned herein, such as the scattering angle, the radial coordinate r or the direct space parameter corresponding to the lattice distance. An example of an intensity distribution is shown in FIG. 7. Preferably, the next step of the analysis is the identification of one or more diffraction peaks, such as the first diffraction peak (FDP) and/or the second diffraction peak (SDP). The position of these peaks are preferably noted in terms of their Q-value. The inventors have found that the internal strain of the sample can be correlated with the position of said intensity peaks in the diffraction pattern. Moreover, the inventors have realised that the position of the peaks shifts towards lower Q-values for larger values of strain in the direction of the external strain (corresponding to a larger degree of stretching of the sample), whereas the position of the peaks shifts towards higher Q-values in the transverse direction of the external strain. This observation is shown in FIG. 8, which shows a plurality of diffraction signals for different values of strain of the sample, wherein each diffraction signal has been subtracted from the diffraction signal of the unstrained sample. In this figure, the graphs of light colours correspond to a small strain of the sample and the dark colours correspond to a large strain. Values of zero indicate no changes between the diffraction pattern of the strained sample versus the unstrained sample. Accordingly, positive values imply that the intensity for a given Q-value of the strained sample is lower compared to the intensity for a given Q-value of the unstrained sample and vice versa for negative values. In other words, the emergence of a positive peak around $Q=1.5$ Å$^{-1}$ and the emergence of a negative peak around $Q=1.6$ Å$^{-1}$ implies that the position of the peak has shifted from approximately $Q=1.6$ Å$^{-1}$ to $Q=1.5$ Å$^{-1}$. According to this embodiment, the analysis comprises the step of determining the position and/or the shifts, ΔQ, in the position of the diffraction peaks in one or more intensity distributions obtained from the diffraction images. The intensity distributions may be azimuthal intensity distributions or radial intensity distributions.

The diffraction images may be obtained from different regions of the sample, e.g. different volumes of the sample. This allows comparing the position of one or more of said intensity peaks in various regions of the sample in order to infer the strain level in said regions, or in order to infer the relative differences in strain between different regions of the sample. As an alternative, the position of the peaks may be compared to a reference sample, which is ideally unstrained. For amorphous regions, the diffraction pattern represented either in Q-space or in direct space does typically not contain sharp peaks, but still comprises information from one or more characteristic parts of the pattern. The analysis may further comprise the step of identifying one or more of such characteristic parts, wherein the parts are modelled using a function and subsequently compared to a reference pattern obtained from a reference sample, or compared to a pattern obtained from one or more other regions of the sample.

As an example, multiple regions of a sample may be exposed, for each region obtaining one or more diffraction images, and for each diffraction image obtaining one or more 1D diffraction patterns that are subsequently analysed according to the above description. The position of one or more peaks in each 1D diffraction pattern may then be determined and noted, e.g. in terms of its Q-value. A region having a peak at a high Q-value will imply a high strain in this region, and a region having a peak at a lower Q-value will imply a lower strain in this region. The relative terms "high" and "low" should be understood as being relative to a median or an average for a large number of regions in the sample. Hence, when measuring a large number of regions in the sample it is possible to establish a 'base level' that indicates the average strain level or the median strain level. In connection with the azimuthal distribution of shifts compared to the base level, the magnitude and direction of the strain can be inferred. The base level defines the unit tensor and the other regions may then be categorized as a tensor map of the components relative to that unit tensor. This will facilitate the creation of a strain map of the entire sample or at least a representative part of the sample. The strain map will have an orientation of the strain and a magnitude relative to the reference or base level unit tensor. In case the analysis is compared to an unstrained reference sample, absolute values of the internal strain and/or the internal stress in the sample may be inferred.

Figure 4:
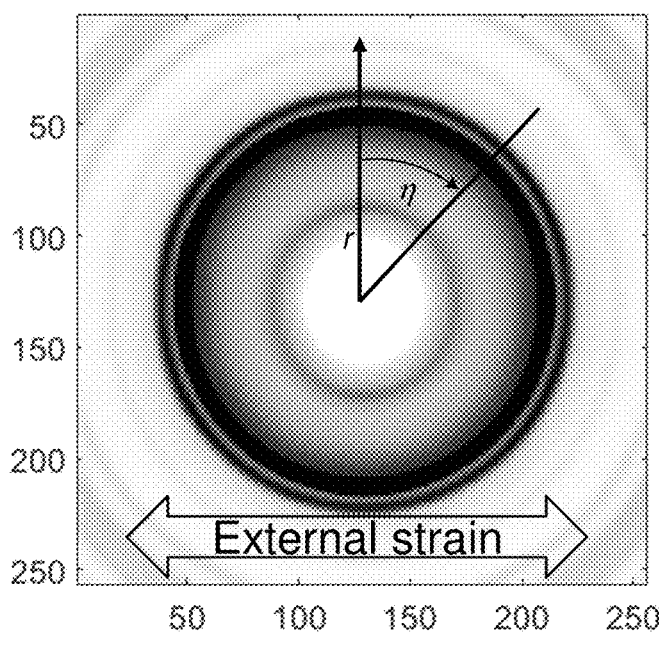
FIG. 4 shows a diffraction pattern collected on the energy dispersive detector for a range of energies. The radial direction r and the azimuthal direction η are indicated on the 2D image.
Figure 13:
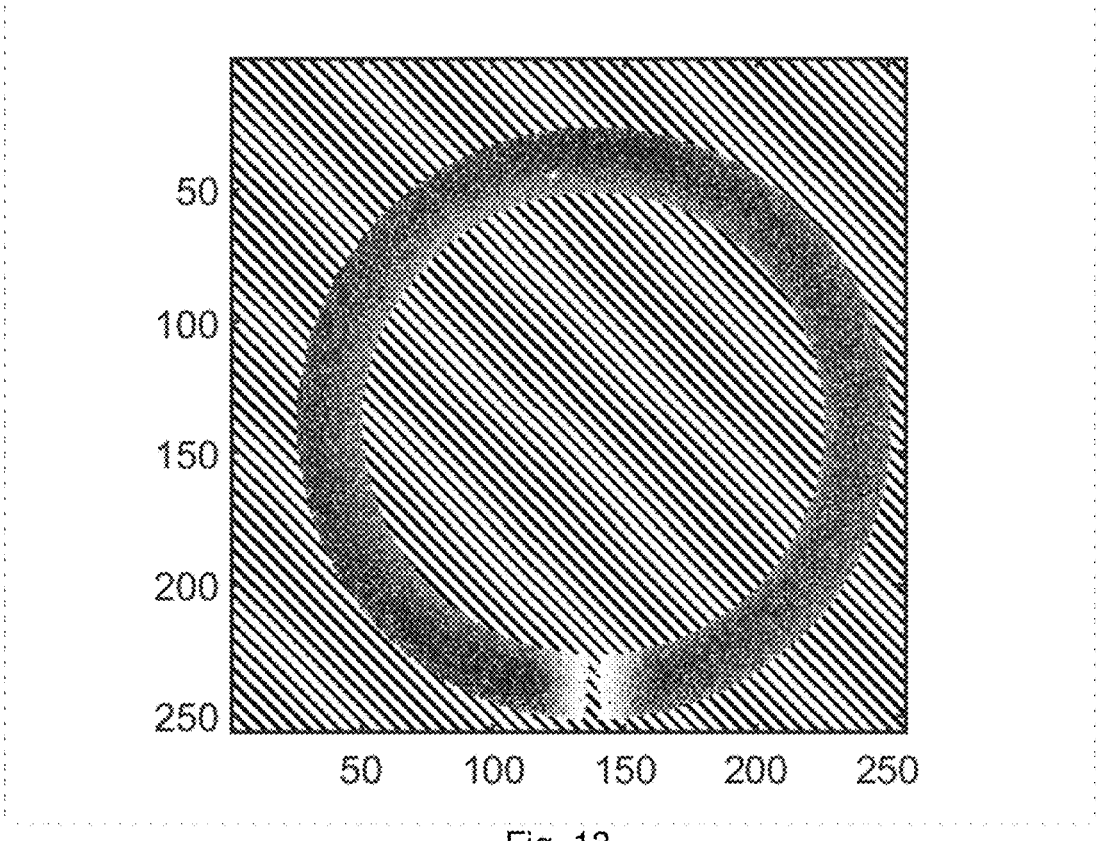
FIG. 13 shows the diffraction signal of FIG. 11, wherein an optical element (here a mask) was used to block part of the diffracted signal from the sample. This particular mask has an opening that lets scattering angles of 9-11.5 degrees through the mask.
Figure 14:
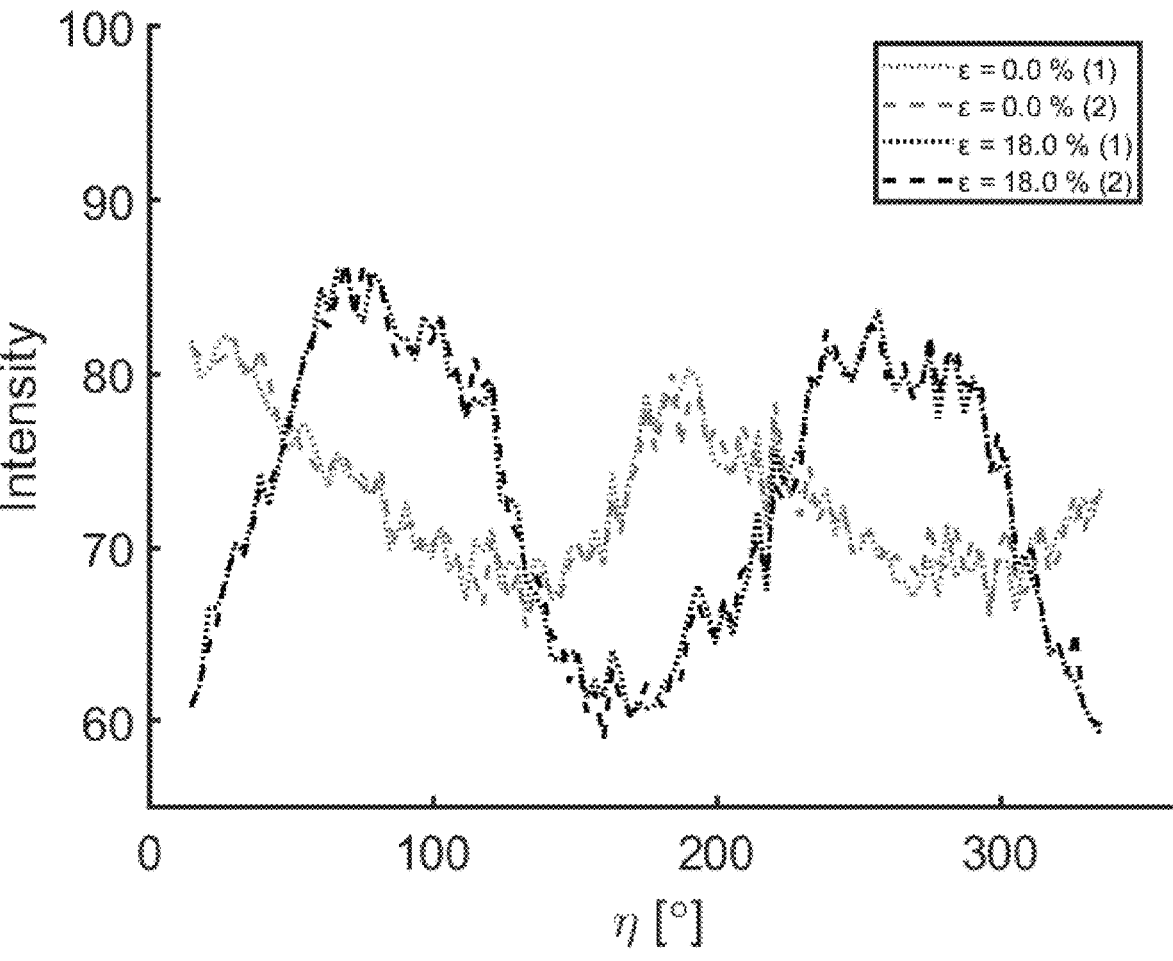
FIG. 14 shows the intensity of the diffraction signal versus the azimuthal angle of the diffraction ring shown in FIG. 12 for various degrees of stretching of the sample.

Another embodiment of the analysis method will now be explained. Similar to the first embodiment of the method, this embodiment comprises the step of obtaining a 1D intensity distribution from the one or more diffraction images. The 1D intensity distribution of this embodiment is preferably an azimuthal intensity distribution, i.e. it expresses the intensity of the diffraction signal as a function of the azimuthal angle η. For each diffraction ring, an azimuthal intensity distribution may be obtained by acquiring data (or selecting data from the raw data) along the azimuth of each diffraction ring. This can be achieved because the diffraction patterns are typically approximately circular symmetric, hence, it is typically suitable to characterize the diffraction patterns with respect to polar coordinates (r, η) as indicated in FIG. 4. The azimuthal intensity distribution may also be obtained by dividing the azimuthal range from 0 to 2π into a plurality of segments such as 24 segments, and subsequently summarizing the contributions from each segment or integrating the intensity over the entire azimuthal range. Examples of azimuthal intensity distributions for different values of strain of the sample are shown in FIG. 13 and FIG. 14. The inventors have found that a stretching of the sample induces a variation in the intensity of the diffraction ring along the azimuthal angle. When the sample is stretched, the polymer chains are forced to align in the strain direction, which increases the intensity of the diffraction ring in this direction. Accordingly, by determining the position of the intensity peaks in the azimuthal intensity distribution, it is possible to infer the internal strain orientations of the exposed region of the sample, even in case the exposed region is amorphous. FIG. 13 shows the azimuthal intensity distribution for various degrees of stretching of the sample. It is observed that the amplitude of the intensity peaks increases for increasing levels of external strain. FIG. 14 shows the ratio of the azimuthal integrated data of the strained and unstrained intensity distribution for two different levels of engineering strain plotted together with a fit of a sinusoidal function (solid curve). A ratio of 1 corresponds to an unstrained sample. Again, it is observed that the amplitude of the peaks increases with increasing levels of strain. This relationship is plotted in FIG. 15, which shows a linear relationship between the amplitude of the sinusoidal fitting function applied to the data in FIG. 14, wherein said amplitude is plotted as a function of the macroscopic strain (in percent).

Yet another embodiment of the analysis method will now be explained. This particular embodiment requires the apparatus to comprise the optical element as disclosed herein. Hence, this embodiment of the analysis method is suitable together with the presently disclosed X-ray diffraction method, wherein an optical element is placed in the beam path, said optical element configured for blocking a part of the diffracted beams. The optical element should preferably be configured such that it may be translated along the beam path as indicated in FIG. 1B. This facilitates that different parts of the diffracted signal may be blocked by the optical element, and that by moving the optical element axially along the beam path it is possible to select or change which parts of the diffracted signal that are blocked. The method comprises the step of scanning/moving the optical element through the diffracted signal, e.g. from a first position close to the sample to a second position closer to the detector, wherein one or more diffraction images are captured by the detector for a plurality of different axial positions of the optical element. Additionally or alternatively to the configuration described above, the optical element may be configured such that it may be translated in other directions than along the beam path, e.g. along a plane orthogonal to the beam path. Preferably, at least one diffraction image is obtained for each axial position of the optical element. The diffraction images may be analysed using any of the analysis methods described herein, however with the additional step of providing a novel reconstruction algorithm that may be used to provide depth information of the sample. In other words, the reconstruction algorithm facilitates the obtainment of a 3D strain map of the sample. The spatial resolution of the strain map in the depth direction (i.e. the direction along the optical axis 6) may be improved or relaxed dynamically according to the need during the measurement. Generally, more positions of the optical element and accompanying diffraction patterns increase the resolution. Similarly, decreasing the beam size and/or decreasing the divergence angle typically increases the accuracy of the reconstructed depth dimension. In most cases the reconstruction will be performed with physical models of the measured materials imposing constraints on the solution and thus improving the accuracy of the strain map. In a preferred application of the method, the dimensions of the sample are known from other measurements and impose further constraints on the solution.

DETAILED DESCRIPTION OF DRAWINGS

FIG. 1A shows a schematic of an apparatus for X-ray diffraction analysis according to the present disclosure. The apparatus comprises a polychromatic X-ray source 1 configured for emitting X-rays 8, a collimator 2 configured for collimating the emitted X-rays 8 from the X-ray source 1, a stage 4 for holding a sample 3, and a detector 5 for collecting at least a part of the diffracted X-rays 9 from the sample 3. The apparatus may further comprise a beam stop (not shown) configured for blocking the central beam coinciding with the optical axis 6. The central beam is not shown in this figure since it coincides with the optical axis 6. It is noted that the apparatus is seen in cross-section. In reality, the diffracted X-rays 9 are cones and the diffraction pattern acquired on the detector 5 appears as diffraction rings (not visible in this cross-sectional view).

FIG. 1B shows a schematic of an apparatus for X-ray diffraction analysis according to the present disclosure, wherein an optical element 7 has been placed in the beam path between the sample 3 and the detector 5. The optical element 7 (here exemplified as a mask) can be used to reconstruct depth information of the sample 3. An image of the diffraction signal can be generated for each position of the mask as it is translated along the optical axis 6 between the sample 3 and the detector 5. For each depth of the sample 3 and each angular range of the signal, the mask will in some positions block the signal and in other positions allow the signal to be collected on the detector 5. With detailed knowledge of the geometry of the apparatus, the most likely signal to be emitted from each region of the sample 3 can be reconstructed from the collected dataset.

Figure 2:
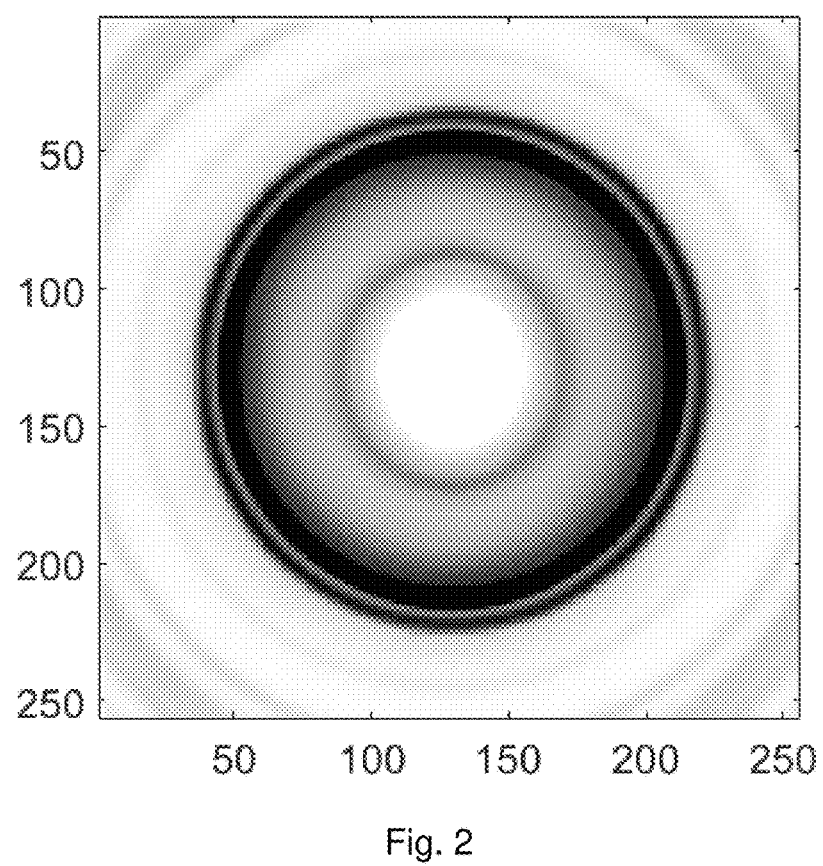
FIG. 2 shows the diffracted signal collected on the energy dispersive detector.

FIG. 2 shows the diffracted signal collected on the energy dispersive detector 5. In this example, the detector 5 comprises 256×256 pixels. The diffracted signal appears as diffraction rings on the detector 5.

Figure 3:
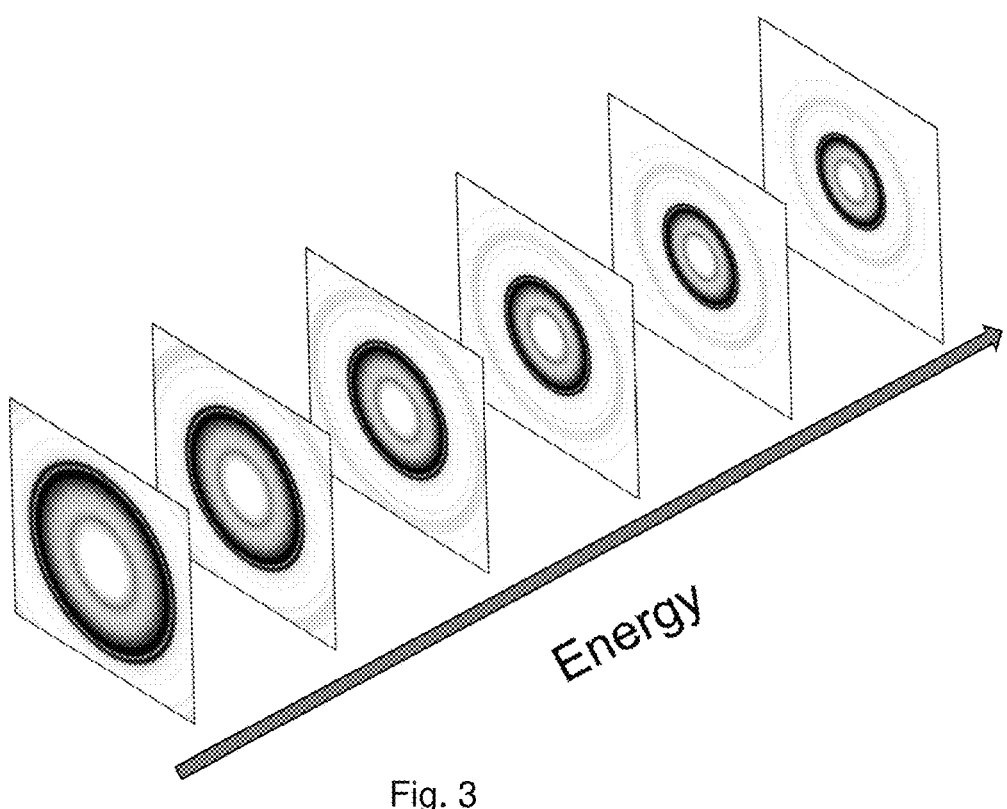
FIG. 3 shows how the diffracted signal may be acquired into separate energy bins which is necessary in order to analyse the diffracted signal.

FIG. 3 shows how the diffracted signal may be split into separate energy bins in order to analyse the diffracted signal. The radius of the diffraction rings decreases with increasing energy. The separation of the signal into multiple energy bins allows higher order rings to become visible on the detector 5.

FIG. 4 shows a diffraction pattern collected on the energy dispersive detector 5 for a range of energies. The intensity displayed on the vertical scale shows the scattering angle. The pattern can be described in terms of radial (r) and azimuthal (η) coordinates (r, η), wherein r is related to the radial distance in reciprocal space, also denoted the Q-value.

Figure 5:
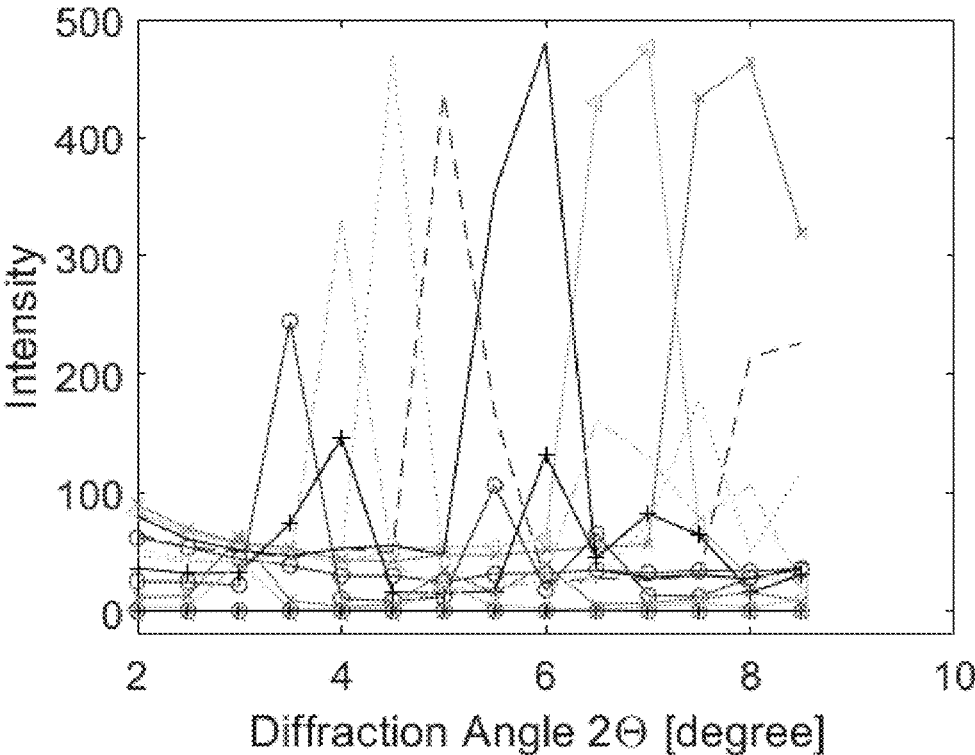
FIG. 5 shows the intensity of the diffracted signal versus the diffraction angle for different energy bins.

FIG. 5 shows the intensity of the diffracted signal versus the diffraction angle for different energies (energy bins). There is a large degree of overlap between the curves, which makes it difficult to distinguish the curves from one another. Consequently, it is difficult to perform a useful analysis on the basis of this plot alone. The presently disclosed method suggests how to transform the plot using the scattering vector length (Q-value) in order to better distinguish the intensity peaks.

Figure 6A:
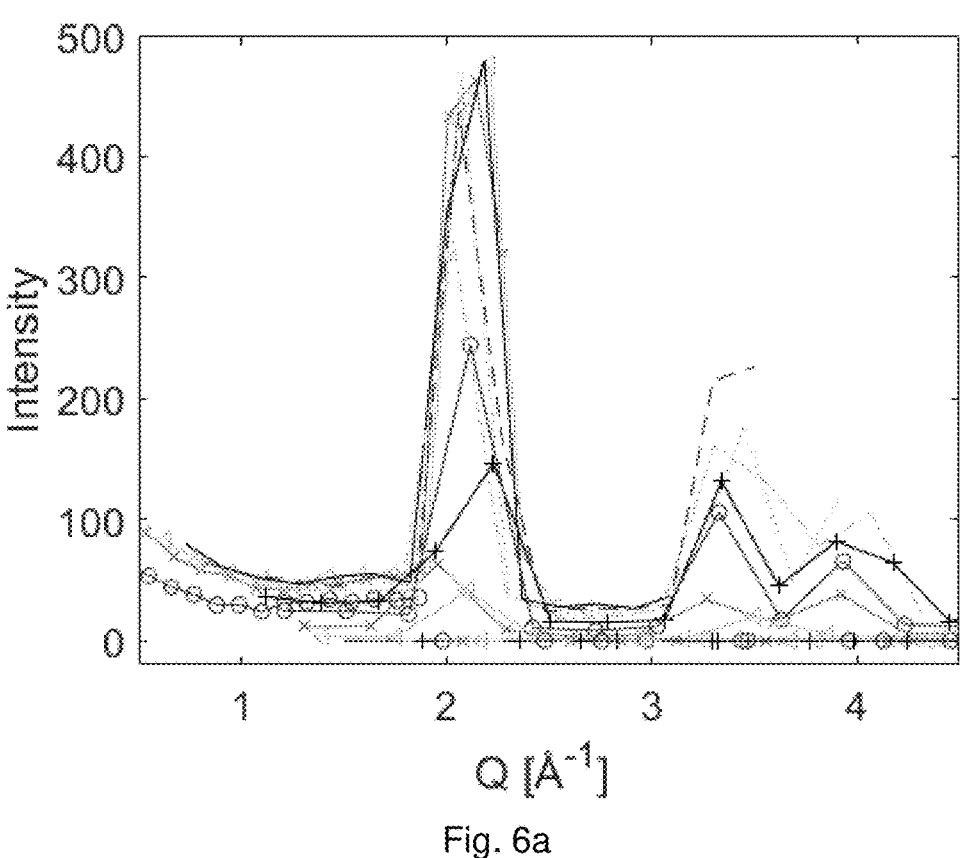
FIG. 6a shows how the energy resolved signals can be ordered according to their scattering vector length Q. In this description, the patterns for each energy bin align.

FIG. 6a shows the same data shown in FIG. 5, however here displayed using the Q-values, i.e. the graph shows the intensity versus the Q-value (units of 1/ Å). The Q-value combines the diffraction angles (2θ) and the energies (wave-lengths) of the diffracted X-rays into a single measure, Q. Using the Q-value has the benefit that the patterns for each energy bin align with each other.

Figure 6B:
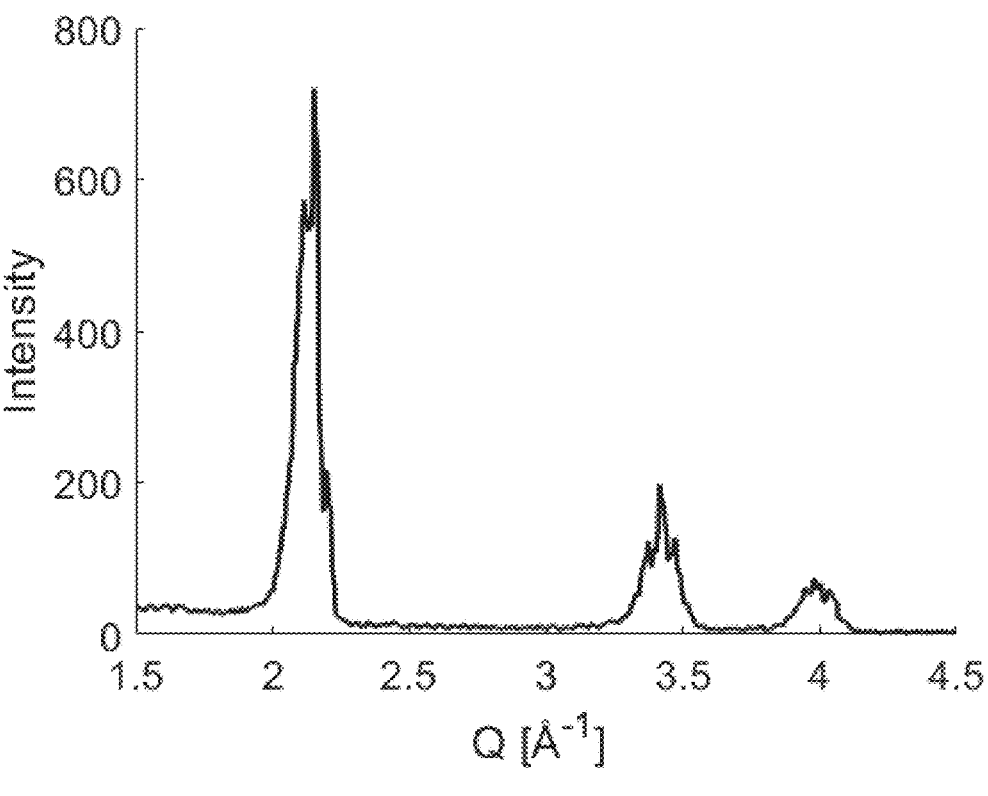
FIG. 6b shows how the diffraction signal from each energy bin can be combined to a single signal with higher signal to noise ratio by the use of the scatter vector Q. The graph is formed from a superposition of the signal from each energy bin to achieve a higher signal to noise ratio. The intensity is a function of the common scatter vector Q.

FIG. 6b shows the same data shown in FIG. 6a. Here, the diffraction signal from each energy bin is combined (by superposition) to a single graph in order to achieve a higher signal to noise ratio of the signal. The intensity is a function of the common scatter vector Q. The position of the diffraction peaks in Q-space correlates with the bond length of the material, and can thus be used to map/determine the internal strain of the material.

FIG. 7 shows the diffraction signal from a polyethylene (PE) sample 3. The plot shows a graph of the intensity of the signal versus the Q-value. The diffraction pattern shows intensity peaks at some Q-values. Hence, the method is able to obtain diffraction information of semi-crystalline materi-als even from the amorphous regions of the material.

FIG. 8 shows the diffraction signal from an amorphous sample (atactic polystyrene). The plot shows a graph of the intensity of the signal versus the Q-value, which correlates directly with the bond length. The diffraction pattern shows two intensity peaks at certain Q-values. While the peaks are broader than those of a semi-crystalline material (see FIG. 7), the position of the peaks can be determined and the strain can be inferred from the positions (Q-values). Hence, the method is able to obtain diffraction information of amor-phous materials.

Figure 9A:
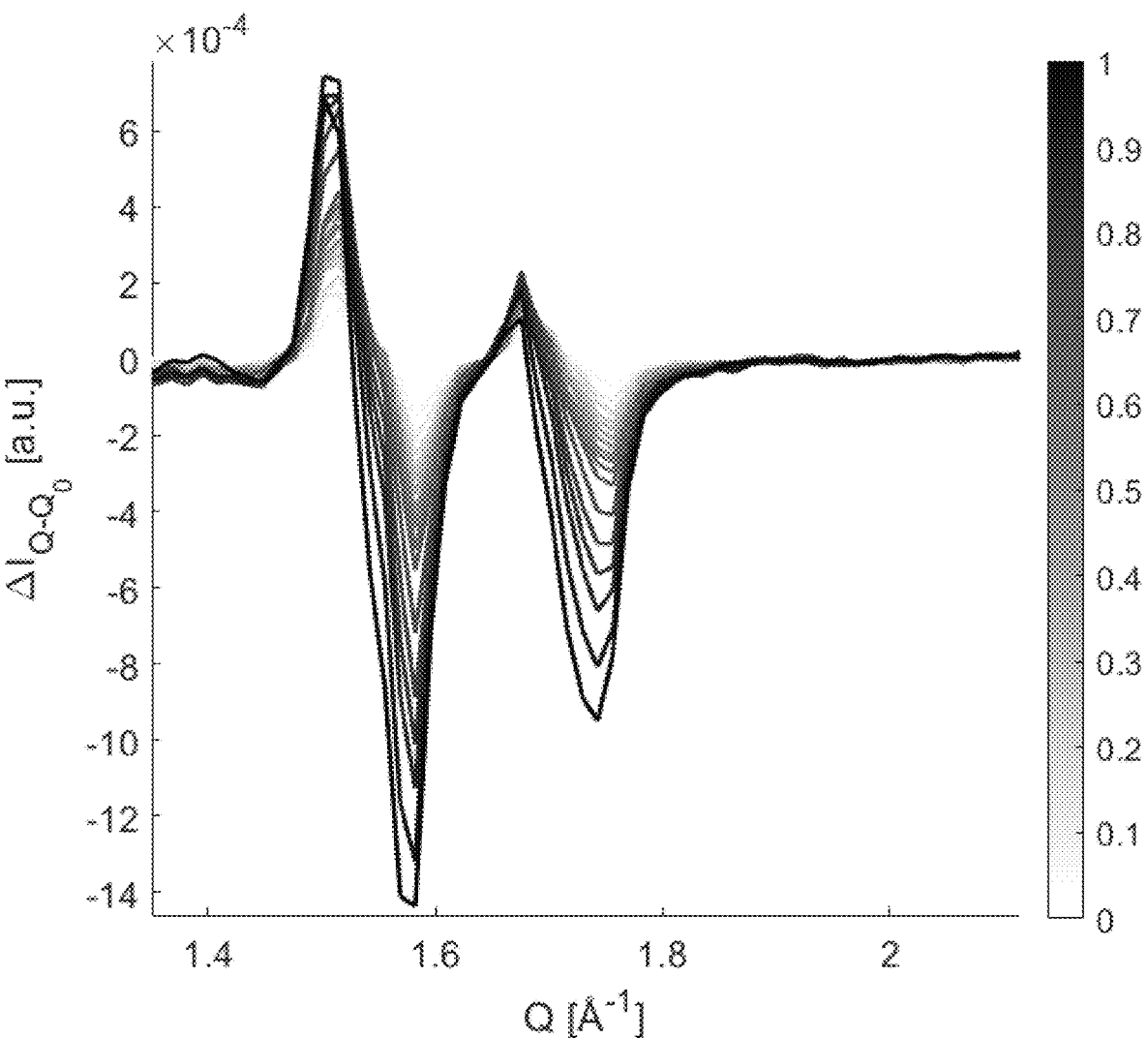
FIG. 9a shows a series of diffraction signals from a PE sample taken from an azimuthal angle parallel with the stretching direction, wherein the sample was stretched in discrete steps and a diffraction signal was obtained at each step. Each of the plotted graphs is formed by subtracting the obtained diffraction signal for a particular strain level from the diffraction signal of the unstrained sample.

FIG. 9a shows a series of diffraction signals from a PE sample 3, wherein the sample 3 was stretched in discrete steps and a diffraction signal was obtained at each step. Each of the plotted graphs is formed by subtracting the obtained diffraction signal for a particular strain level from the diffraction signal of the unstrained sample 3. Thereby, it becomes more visible how the position of the peaks shift towards lower Q-values for higher values of strain. The graphs of light colours correspond to a small strain of the sample 3 and the dark colours correspond to a large strain. It is noted that for larger values of strain (corresponding to a larger degree of stretching of the sample 3), the difference signal indicate a peak value shifts towards lower Q-values. This is the case both for the first order peak at a Q-value of approximately 1.5 Å$^{-1}$ and the second order peak at approxi-mately 1.7 Å$^{-1}$. Accordingly, the method is useful for determining the internal strain, since it directly correlates with the position of the intensity peak(s) in Q-space. The method does not rely on providing an external strain, since the internal strain can arise during manufacture etc. of the sample. The external strain is only provided to verify the method.

Figure 9B:
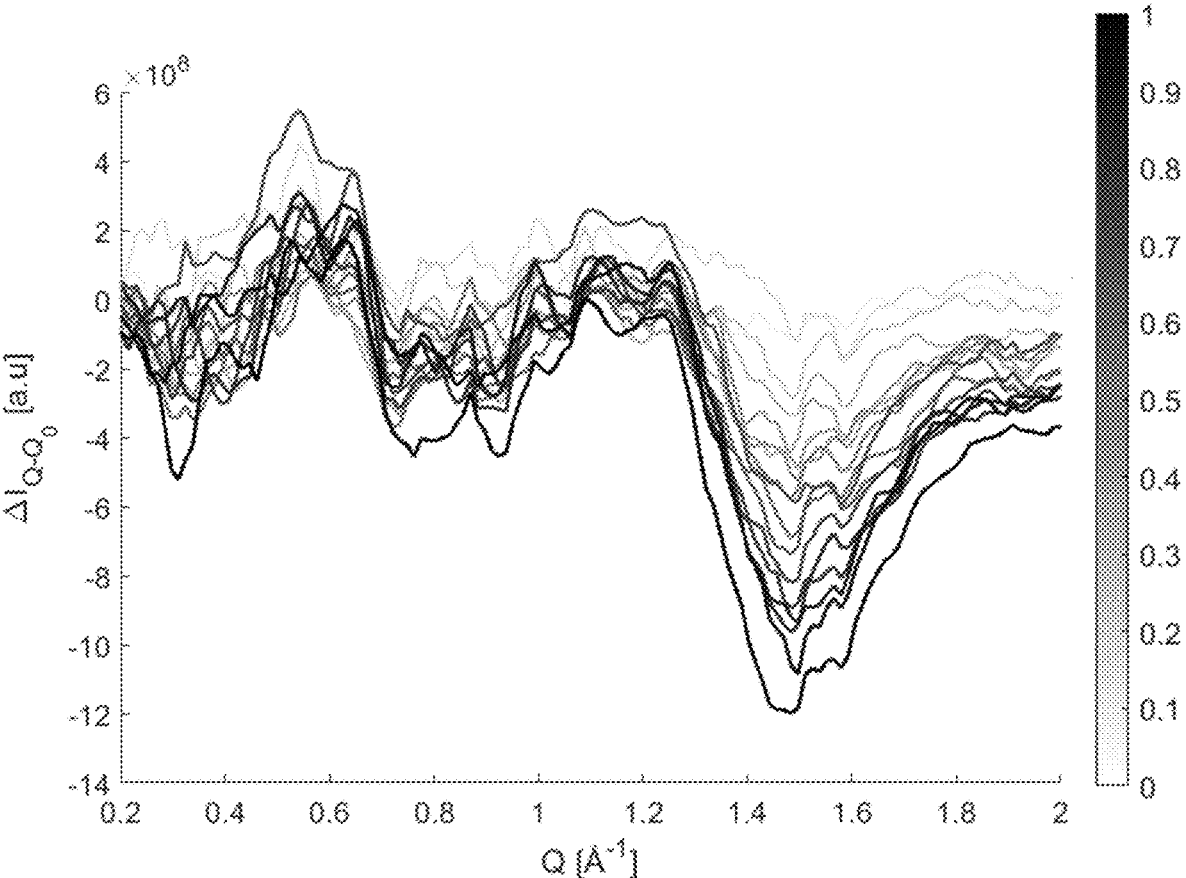
FIG. 9b shows a series of diffraction signals from an amorphous sample (atactic polystyrene), which has been stretched in discrete steps. Each curve corresponds to a particular strain level (indicated by the greyscale) wherein the diffraction signal of the unstrained sample has been subtracted.

FIG. 9b shows a series of diffraction signals from an amorphous sample (atactic polystyrene), wherein the sample was stretched in discrete steps and a diffraction signal was obtained at each step. Each of the plotted graphs is formed by subtracting the obtained diffraction signal for a particular strain level from the diffraction signal of the unstrained sample. Thereby, it becomes more visible how the position of the peaks shift towards lower Q-values for higher values of strain. The graphs of light colours correspond to a small strain of the sample and the dark colours correspond to a large strain. It is noted that for larger values of strain (corresponding to a larger degree of stretching of the sample), the difference signal indicates a peak value shifts towards lower Q-values. Accordingly, the method is useful for determining the internal strain in an amorphous sample by correlating the position of one or more intensity peaks (e.g. in Q-space) with the bond length of the sample. Here, the externally imposed strain only serves to verify the method. In a real world application, one can infer strain information of the sample without imposing an external strain, since the obtained curve(s) can be compared to a reference and/or multiple diffraction signals can be obtained from different volumes of the sample in order to obtain a relative strain map.

Figure 10:
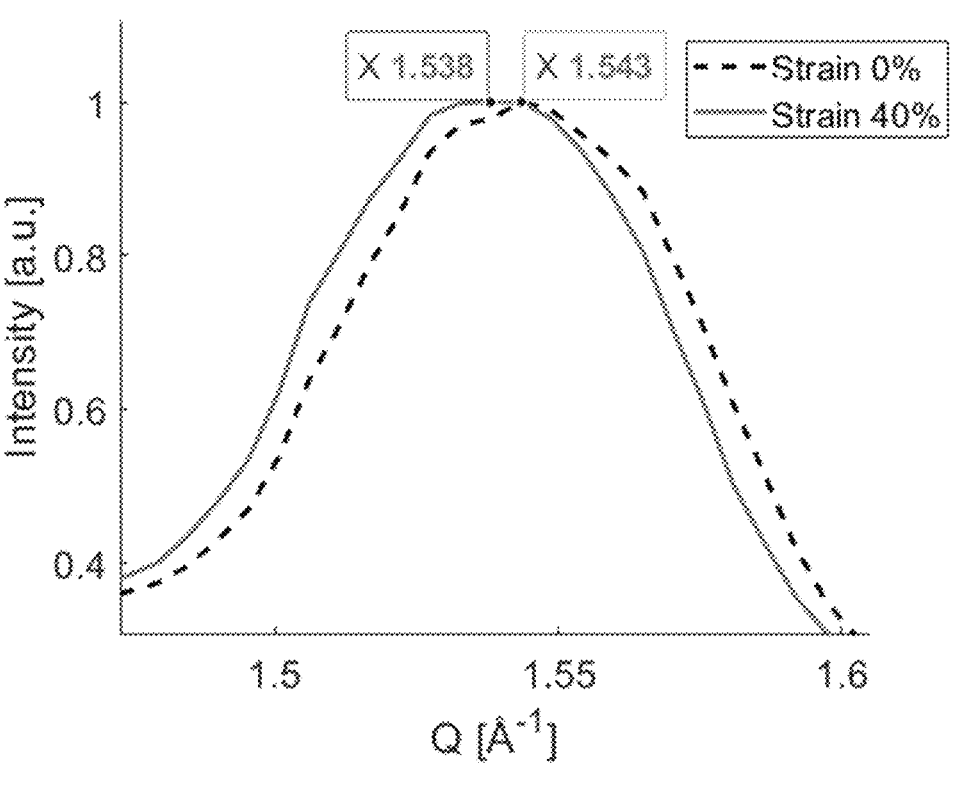
FIG. 10 shows a zoom-in of the first diffraction peak (FDP) of FIG. 7. The two curves correspond to two different strain values. The peak shifts towards a lower Q-value with increased strain.

FIG. 10 shows a zoom-in of the first diffraction peak (FDP) of FIG. 7. The two curves correspond to two different strain values. The peak shifts towards a lower Q-value with increased strain. Accordingly, by determining the position of the FDP or the shift in Q-value, ΔQ, of the FDP between two different strain levels, the internal strain can be inferred. The shift towards higher Q-values is observed at distinct angular positions (described by the azimuthal angle) around the diffraction ring. In other words, the internal strain directions in the material can be observed by observing the shift of the intensity peaks of the diffraction ring(s).

Figure 11:
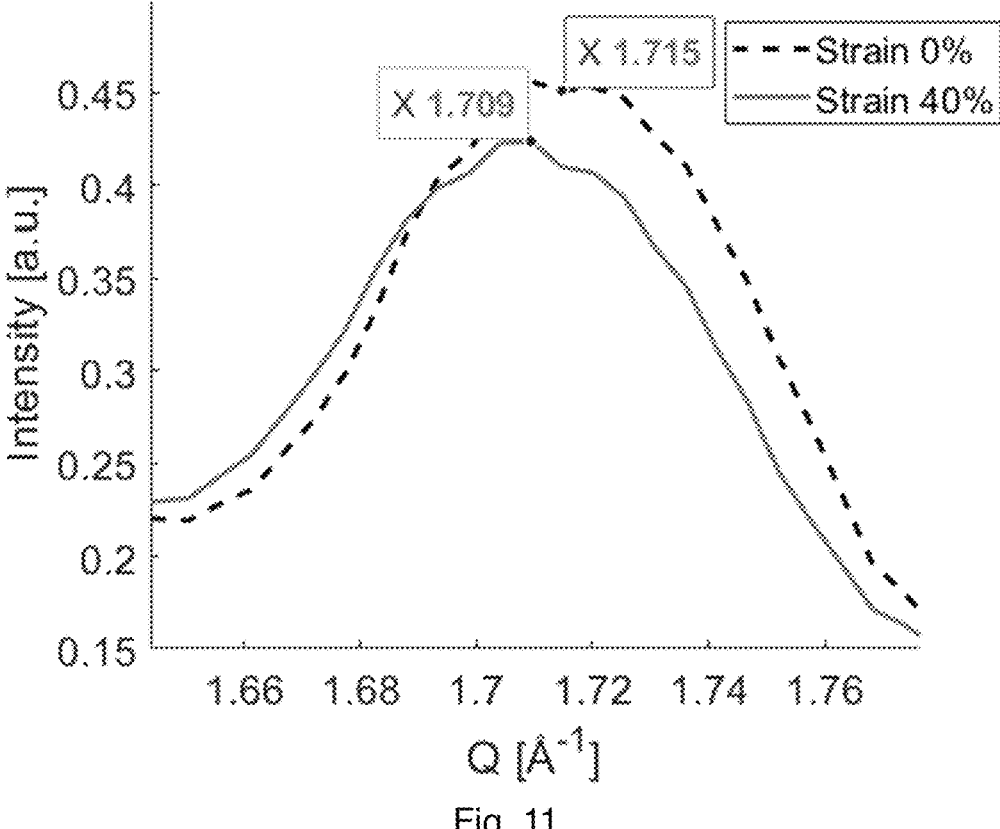
FIG. 11 shows a zoom-in of the second diffraction peak (SDP) of FIG. 7. The two curves correspond to two different strain values. The peak shifts towards a lower Q-value with increased strain.

FIG. 11 shows a zoom-in of the second diffraction peak (SDP) of FIG. 7. The two curves correspond to two different strain values. The peak shifts towards a higher Q-value with increased strain. Accordingly, by determining the position of the SDP or the shift in Q-value, ΔQ, of the SDP between two different strain levels, the internal strain can be inferred. The shift towards higher Q-values is observed at distinct angular positions (described by the azimuthal angle) around the diffraction ring. In other words, the internal strain directions in the material can be observed by observing the shift of the intensity peaks of the diffraction ring(s).

Figure 12:
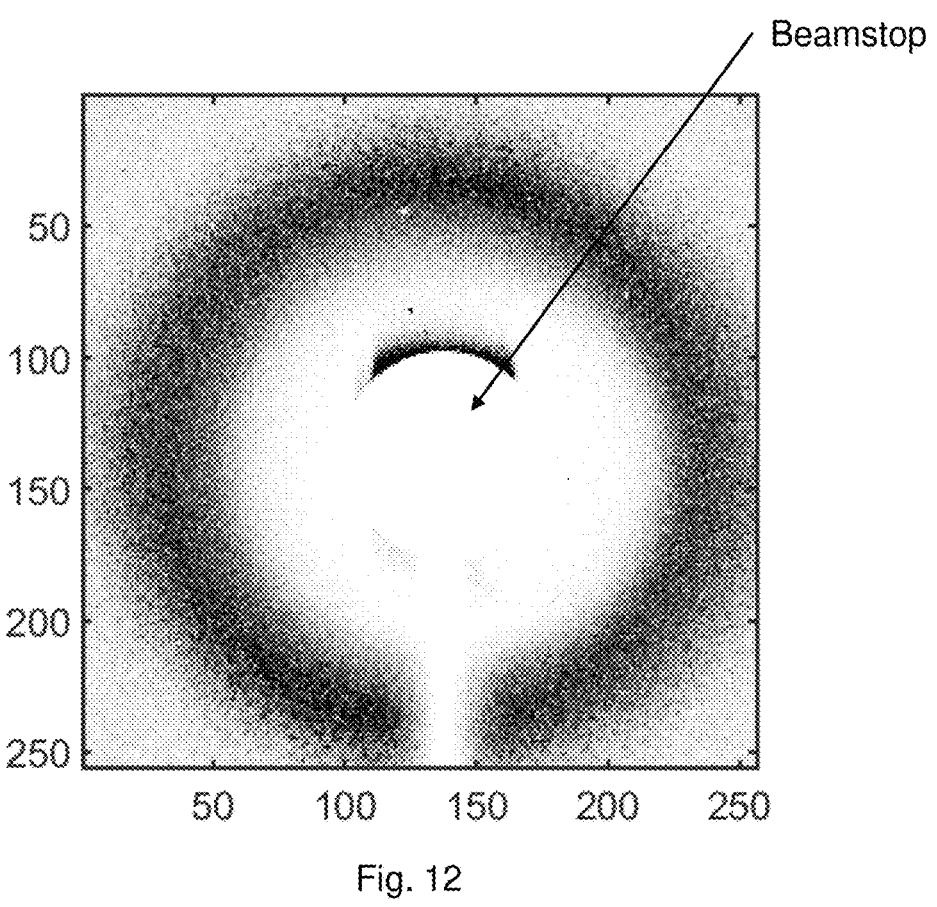
FIG. 12 shows a diffraction signal on the energy dispersive detector obtained from an experiment. The center of the diffraction signal is blocked by a beam stop to reduce unwanted scattering from the detector material.

FIG. 12 shows a diffraction signal on the energy disper-sive detector 5 obtained from an experiment. The center of the diffraction signal is blocked by a beam stop to reduce unwanted scattering from the detector 5 material.

FIG. 13 shows the diffraction signal of FIG. 11, wherein an optical element 7 (here a mask) was used to block part of the diffracted signal from the sample 3. This particular mask has an opening that lets scattering angles of 9-11.5 degrees through the mask.

The shaded region indicates that this part of the diffracted signal has been filtered/is not considered in the analysis.

FIG. 14 shows the intensity of the diffraction signal versus the azimuthal angle of the diffraction ring shown in FIG. 12 for various degrees of stretching of the sample 3. It is observed that the stretching induces a variation in the intensity of the diffraction ring along the azimuthal angle. When the sample 3 is stretched, the polymer chains are forced to align in the strain direction, which increases the intensity of the diffraction ring in this direction.

Figure 15:
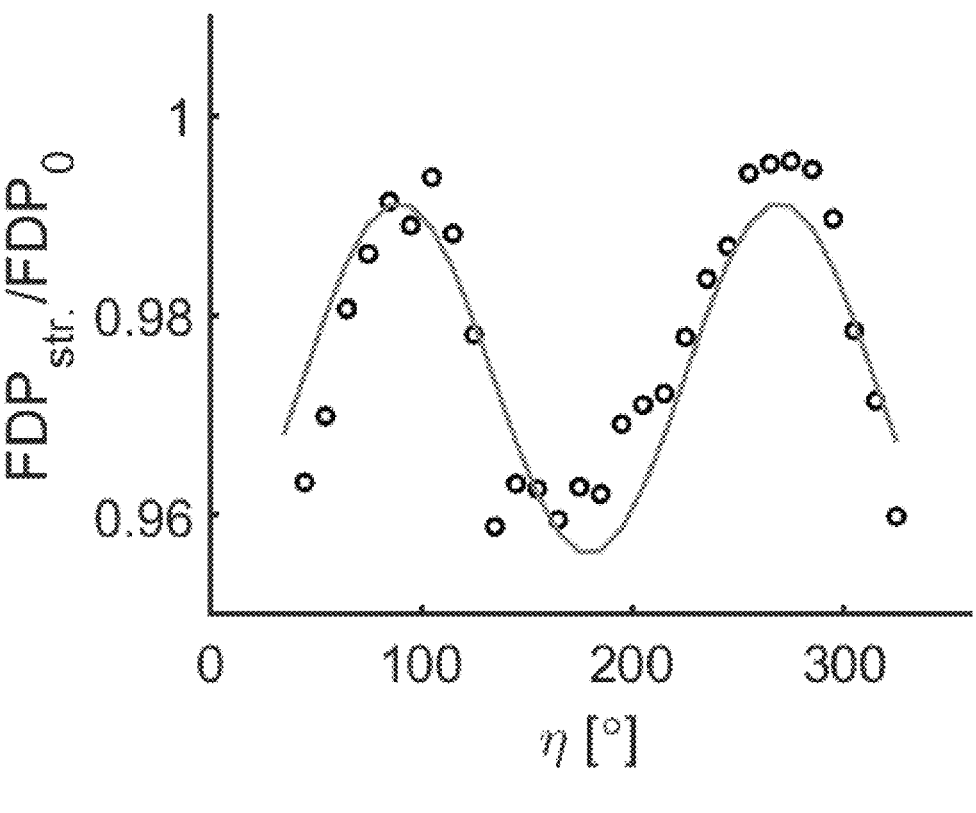
FIG. 15 shows the ratio of azimuthally resolved shifts in the diffraction peak between the intensity distribution for two different levels of engineering strain plotted together with fit of a sinusoidal function (solid curve) the factors of each of the terms correspond to a component in a strain tensor.

FIG. 15 shows the ratio of the intensity of the first diffraction peak (FDP) of a strained sample relative to an unstrained sample versus the azimuthal angle (i.e. the angu-lar distribution along the diffraction ring). It is observed that the stretching induces a sinusoidal variation of the intensity of FDP relative to the unstrained case. The solid line is a sinusoidal fit to the data.

Figure 16:
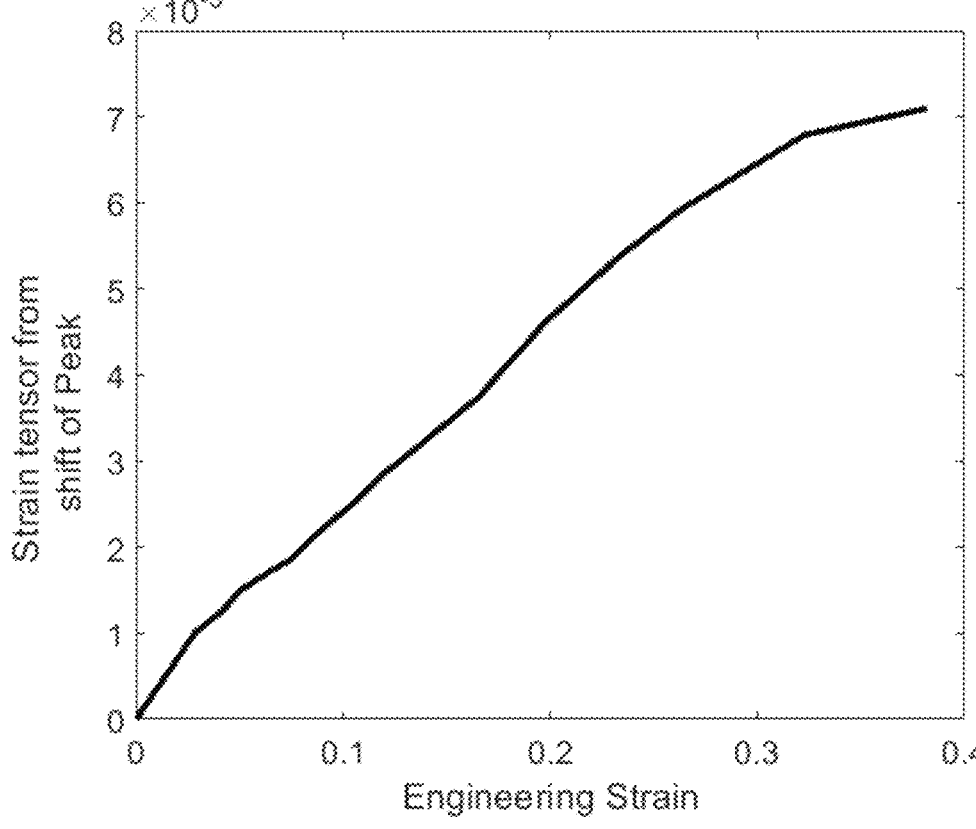
FIG. 16 shows the amplitude of the sinusoidal fitting function of FIG. 14 plotted as a function of the macroscopic strain. A linear relationship is observed.

FIG. 16 shows the amplitude of the sinusoidal fitting function of FIG. 14 plotted as a function of the engineering strain (macroscopic strain). A linear relationship is observed.

Figure 17:
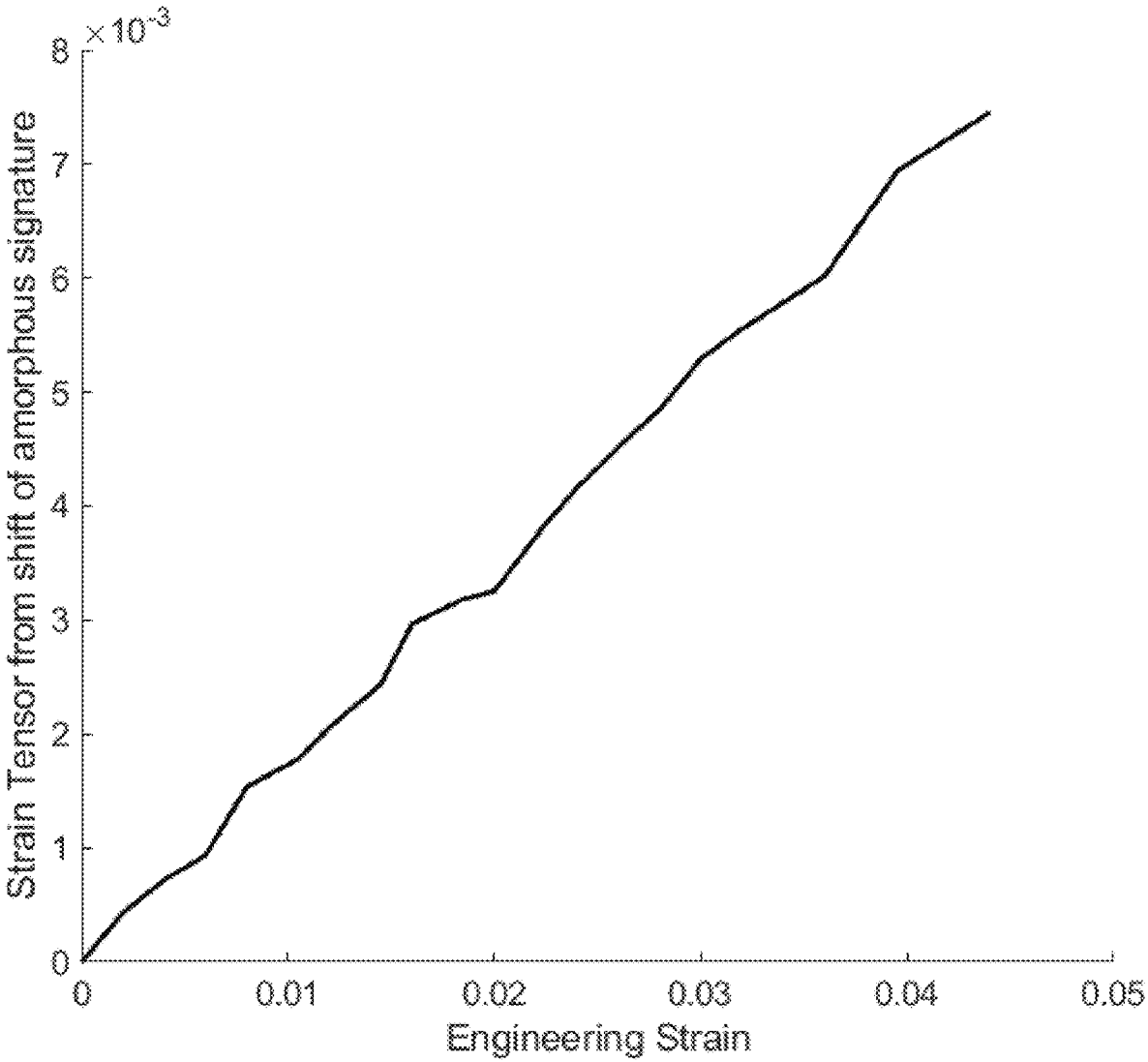
FIG. 17 shows a similar plot as shown in FIG. 16, however FIG. 17 displays data from an amorphous sample. Hence, a similar behaviour is observed in amorphous samples.

FIG. 17 shows a similar plot as shown in FIG. 16, however FIG. 17 displays data from an amorphous sample. Hence, a similar behaviour is observed in amorphous samples.

Figure 18:
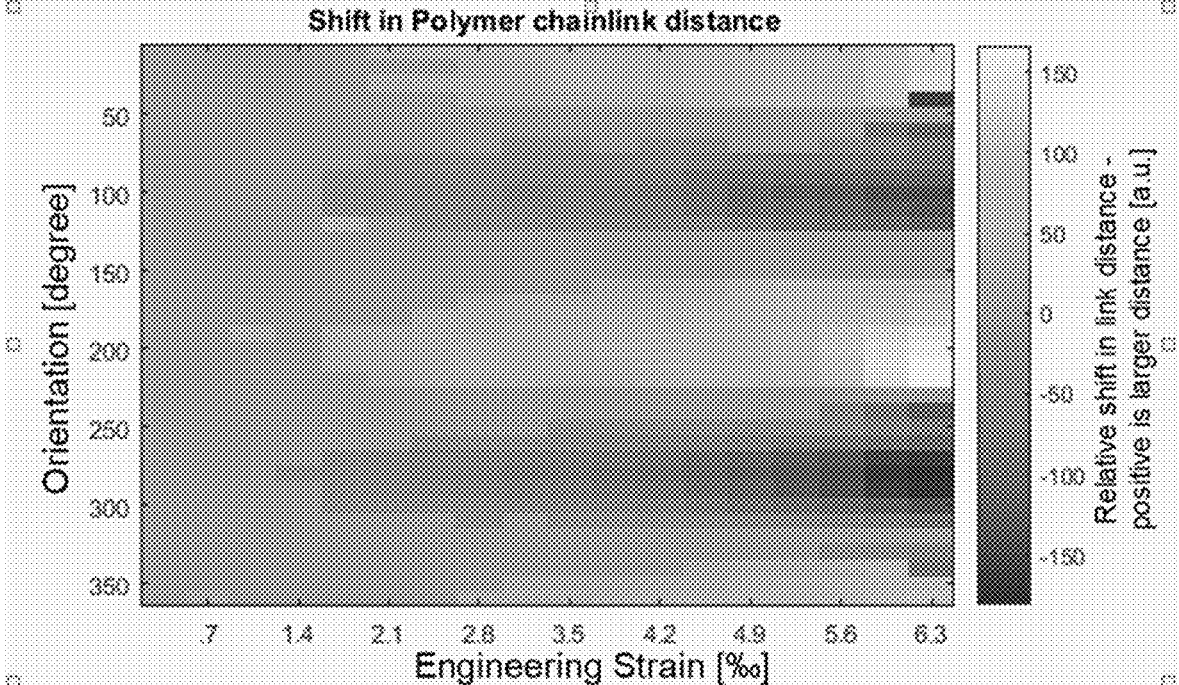
FIG. 18 shows experimental results achieved using a synchrotron as the X-ray source. The plot shows the relative shift in polymer chain-link distance versus the internal strain orientation of the material and versus the engineering strain of the sample.

FIG. 18 shows experimental results achieved using a synchrotron as the X-ray source 1. A sample 3 was placed in a strain rig, such that X-ray diffraction images could be obtained while the sample 3 was stretched. The plot shows the relative shift in polymer chain-link distance versus the internal strain orientation (in degrees) of the material and versus the engineering strain (per mille) of the sample 3. The sample 3 was a PE material. It is the radial shift (i.e. shift in Q-values) of the first order diffraction ring that was observed for 37 different orientations (azimuthal angles) and 18 different strain levels. The direction of the external strain was 20° and 200°. As the polymer chains become stretched, they become more tightly aligned (dark colour) in the transversal direction and more separated (light colour) in the tensile direction.

Figure 19:
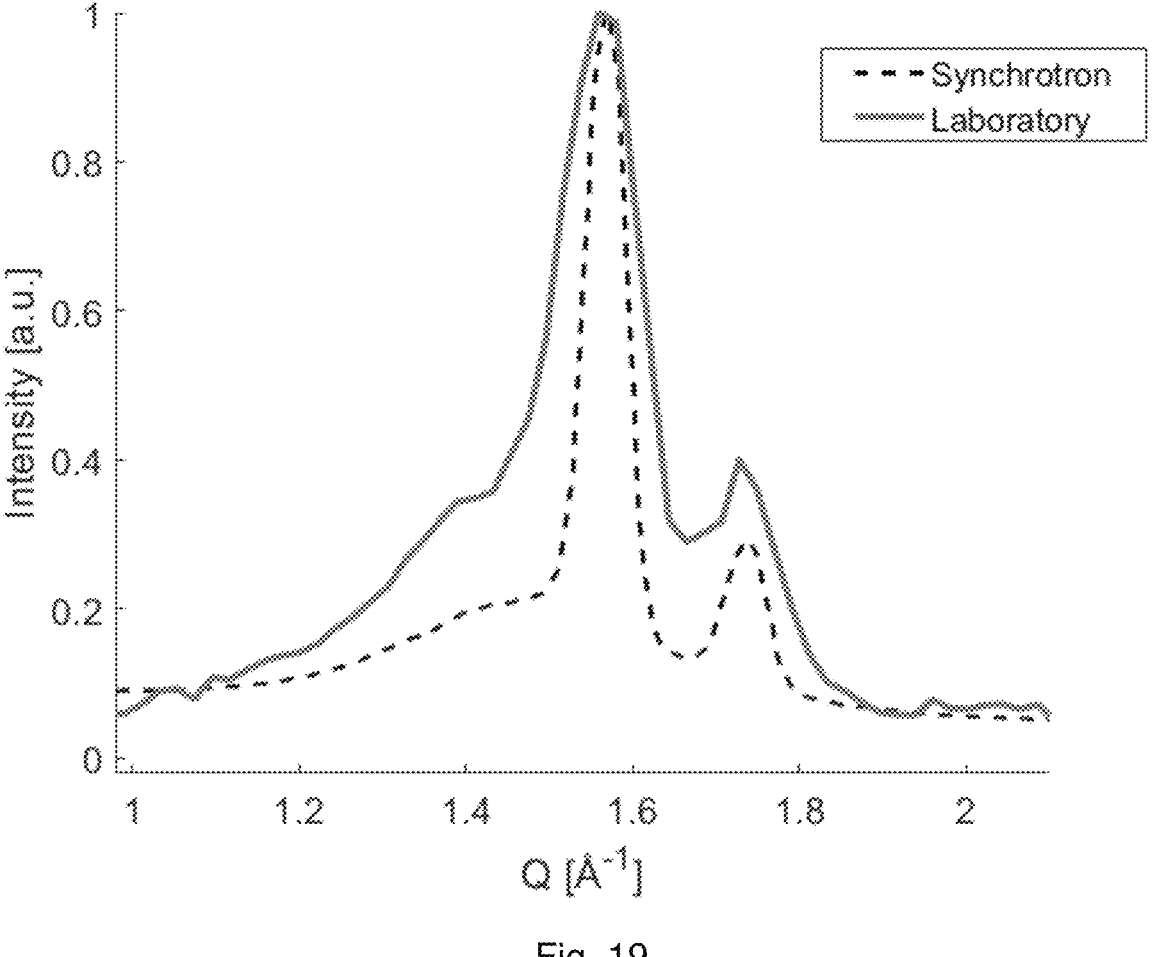
FIG. 19 shows a comparison of the diffraction pattern obtained using two different experimental setups, each setup comprising a different X-ray source, one using a synchrotron and the other using a polychromatic laboratory X-ray source. The figure shows the influence from the polychromatic source and the energy resolution of the detector in a less resolved diffraction pattern.

FIG. 19 shows a comparison of the diffraction pattern obtained using two different experimental setups, each setup comprising a different X-ray source 1, one using a synchrotron and the other using a polychromatic laboratory X-ray source 1. The graph labelled "Laboratory" was obtained using the presently disclosed method and apparatus. It is observed that the main peak occurs at the same Q-value for the two methods, which validates the present method using a Laboratory X-ray source 1.

FIG. 20 shows a schematic of a mask design according to an embodiment of the optical element 7. This mask is configured such that predefined diffraction rings (orders) are blocked in the beam path, such that a part of the diffracted signal is prevented from reaching the detector 5, and another part is allowed through the mask.

Figure 21:
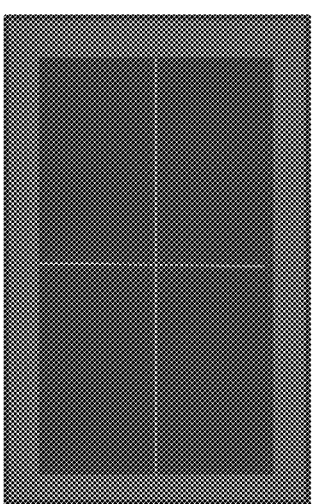
FIG. 21 shows an example of an array of four energy dispersive detectors, said array being compatible with the presently disclosed apparatus and method.

FIG. 21 shows an example of an array of four energy dispersive detectors 5, said array being compatible with the presently disclosed apparatus and method.

Figure 22:
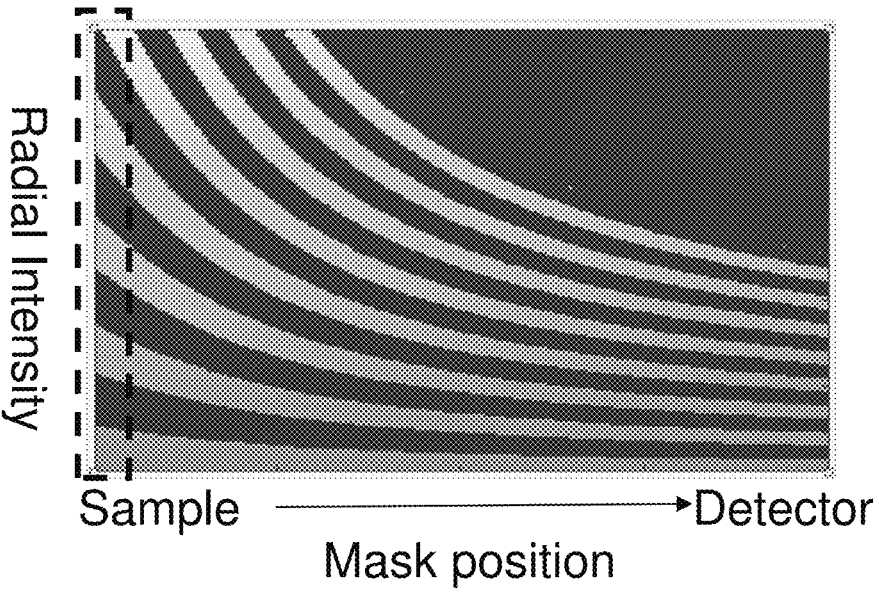
FIG. 22 shows the radial intensity of the diffracted signal on a part of the detector versus the position of a mask placed in the beam path to block certain parts of the diffracted signal.

FIG. 22 shows the radial intensity of the diffracted signal on a part of the detector 5 versus the position of a mask placed in the beam path to block certain parts of the diffracted signal. The data is selected from an annulus sector of the detector 5. The radial intensity refers to the intensity as measured from the center of the beam and radially outwards, with increasing diffraction orders appearing with increasing distance from the center. The horizontal axis correspond to the position of the mask, which can be placed anywhere between the sample 3 and the detector 5. This plot is shown for a specific energy value of the X-ray beam. However, the plot could be extended in a third dimension to include the diffraction signals versus energy.

Figure 23:
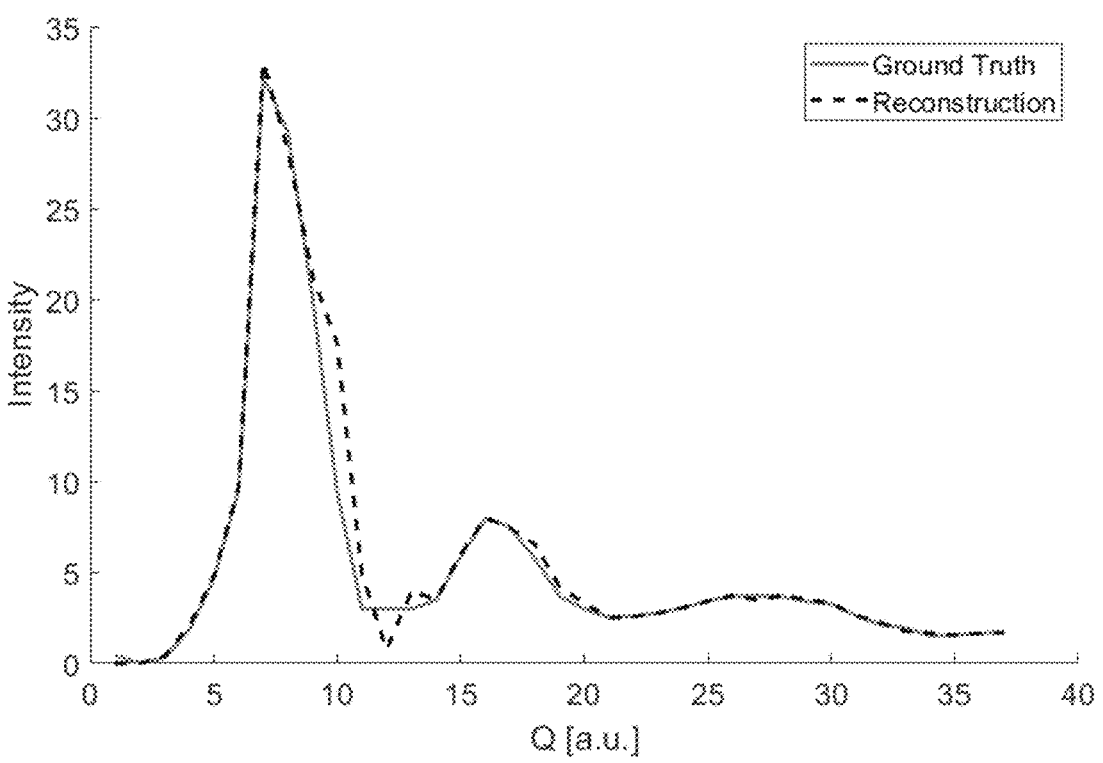
FIG. 23 shows a diffraction signal from one point in the sample, wherein the signal is reconstructed using a mask and a reconstruction algorithm.

FIG. 23 shows a diffraction signal from one point in the sample 3, wherein the signal is reconstructed using a mask and a reconstruction algorithm. The signal is reconstructed for 10 divisions of the sample 3. In the two other dimensions, the beam width/height defines the extent of the sample 3 included in the reconstruction. The data used in the reconstruction is based on 25 different positions of the mask. It is observed that the reconstructed signal is similar to the ground truth.

Figure 24:
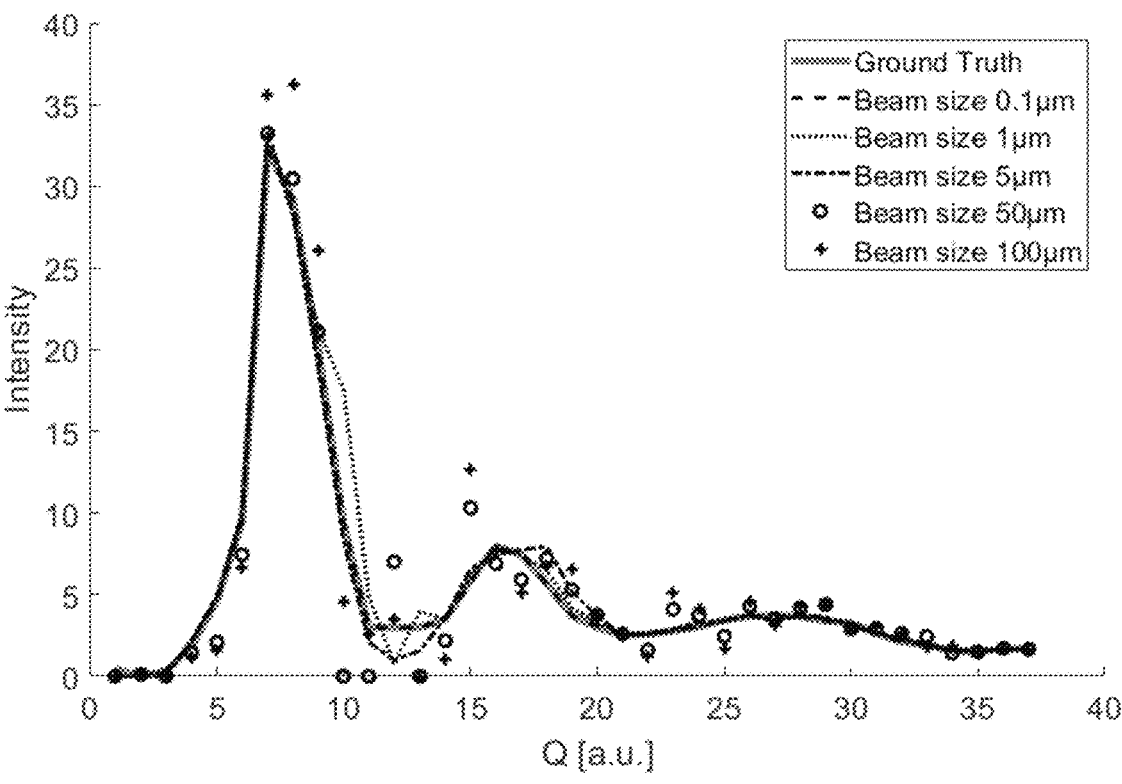
FIG. 24 shows a series of diffraction signals, wherein the beam size (BS) was varied between each consecutive diffraction signal.

FIG. 24 shows a series of diffraction signals, wherein the beam size (BS) was varied between each consecutive diffraction signal. Thus, the variation among the graphs shows the effect of increasing the beam size. In case of a large beam size, the beam causes diffraction from other areas in the sample 3 with an internal structure that changes the diffraction signal. However, a larger beam also causes diffraction to be emitted from a larger volume, which causes a larger ambiguity in the reconstruction.

REFERENCE NUMERALS

1. X-ray source
2. Collimator
3. Sample
4. Stage
5. Detector
6. Optical axis
7. Optical element
8. Emitted X-rays
9. Diffracted X-rays

FURTHER DETAILS OF THE INVENTION

The following list of items should not be construed as claims.

1. An X-ray diffraction method for the analysis of amorphous and/or semi-crystalline materials, the method comprising the steps of:
   a) providing a sample, wherein the sample is a semi-crystalline material or an amorphous material, said material comprising at least one amorphous region;
   b) providing a polychromatic X-ray source;
   c) collimating X-rays from the X-ray source into one or more pencil beams;
   d) exposing at least a region of the sample to the one or more pencil beams, whereby the beam(s) are diffracted;
   e) collecting at least some of the diffracted beams in one or more energy dispersive 2D detectors to obtain one or more diffraction images; and
   f) analysing the obtained diffraction image(s) to determine the internal strain and/or stress in at least the exposed region of the sample.
2. The method according to item 1, wherein the analysis comprises the step of analysing the diffraction signal from the amorphous region of the sample.
3. The method according to any of the preceding items, wherein the one or more pencil beams are substantially parallel to an optical axis of the system.
4. The method according to any of the preceding items, wherein the crystallinity of the analysed material is less than 20%.
5. The method according to any of the preceding items, wherein the material is a semi-crystalline polymer.
6. The method according to any of the preceding items, wherein the material is amorphous.
7. The method according to any of the preceding items, wherein at least four energy dispersive detectors are arranged in an array.
8. The method according to any of the preceding items, wherein each of the energy dispersive detectors comprises a plurality of pixels.
9. The method according to any of the preceding items, wherein an optical element is provided in the beam path, said optical element configured for blocking part of the diffracted beams.
10. The method according to any of the preceding items, wherein the optical element is a mask.
11. The method according to item 9, wherein the optical element is configured for blocking a selected subset of the diffracted beams, said beams having a scattering angle larger than 0°.

12. The method according to item 11, wherein said blocked subset correlates with the position of the optical element, such that the subset can be selected by displacing the optical element axially along the beam path.

13. The method according to any of the items 9-12, wherein the optical element is displaced along the optical axis in a series of diffraction measurements, wherein the diffracted signal is imaged for each position of the optical element.

14. The method according to item 13, wherein a computer-implemented algorithm is used to analyse the obtained diffraction images to deduce depth information of the sample, said depth information relating to the internal strain and/or stress in the sample.

15. The method according to any of the preceding items, wherein the diffraction images are obtained from at least two different strain levels of the sample, the analysis further comprising the steps of:
  a) extracting from the diffraction images at least one 1D diffraction pattern for each strain level;
  b) determining the position of one or more diffraction peaks for each of said 1D diffraction patterns;
  c) determining the difference(s) in the position of said peaks between the 1D diffraction patterns; and
  d) correlating said difference(s) to the internal strain in the exposed region of the sample.

16. The method according to item 15, wherein the one or more diffraction peaks comprise the first diffraction peak (FDP) and/or the second diffraction peak (SDP).

17. The method according to any of the preceding items, wherein the analysis comprises the step of determining the position of one or more intensity peaks in the diffraction image(s) and/or in 1D diffraction pattern(s) obtained from said image(s), wherein the internal strain in the exposed region of the sample can be inferred from said positions.

18. The method according to any of the preceding items, wherein at least two separate regions of the sample are exposed, and wherein at least one diffraction image is obtained for each of said regions.

19. The method according to item 18, wherein the analysis comprises the step of determining the position of one or more intensity peaks in said diffraction images or in 1D diffraction patterns obtained from said images, wherein the internal strain in the exposed region of the sample can be inferred from said positions.

20. The method according to any of the preceding items, wherein the position of the intensity peaks are compared to a reference sample in order to determine the internal strain of the exposed region of the sample.

21. The method according to any of the preceding items, wherein the analysis comprises the steps of determining the position of one or more diffraction peaks; comparing said positions to a reference sample; and determining the internal strain of the exposed region of the sample based on said comparison.

22. The method according to any of the preceding items, wherein the one or more diffraction peaks comprise the first diffraction peak (FDP) and/or the second diffraction peak (SDP).

23. The method according to any of the preceding items, wherein the analysis comprises the step of determining the position of one or more intensity peaks in the azimuthal intensity distribution of one or more diffraction rings formed on the diffraction image(s).

24. The method according to item 23, wherein the position of the intensity peaks, said position specified by the azimuthal angle, is used to determine the internal strain orientations in the exposed region of the sample.

25. An apparatus for X-ray diffraction analysis of semi-crystalline materials, the apparatus comprising:
  a) a polychromatic X-ray source configured for emitting X-rays;
  b) a collimator configured for collimating X-rays from the polychromatic X-ray source into one or more pencil beams;
  c) a stage for holding a sample;
  d) an optical element configured for being displaced along the optical axis of the apparatus in order to provide depth information of the sample; and
  e) one or more energy dispersive X-ray detectors.

26. The apparatus of item 25, wherein the apparatus comprises at least four detectors arranged in an array, each detector comprising a plurality of pixels.

27. The apparatus of item 25, wherein said collimator for collimating X-rays comprises a condenser and/or at least one slit.

28. The apparatus of item 25, wherein the apparatus is configured for carrying out the method according to item 1.

29. A computer-implemented method for analysing X-ray diffraction images of semi-crystalline materials, the method comprising the steps of:
  a) providing a plurality of X-ray diffraction images obtained from a semi-crystalline sample;
  b) optionally extracting one or more 1D diffraction patterns from said diffraction images;
  c) determining the position of one or more intensity peaks in the diffraction images and/or in the 1D diffraction patterns;
  d) comparing said position(s) to similar intensity peaks obtained at a different strain level or obtained in another region of the sample, wherein the difference(s) between the position(s) of the peaks are computed; and
  e) determining the internal strain in at least one region of the sample based on said difference(s).

30. The method according to item 29, wherein the X-ray diffraction images are obtained from at least two separate regions of the sample.

31. The method according to any of the items 29-30, wherein the X-ray diffraction images are obtained from an amorphous region of the sample.

32. A computer-implemented method for analysing X-ray diffraction images of semi-crystalline materials, the method comprising the steps of:
  a) providing one or more X-ray diffraction images obtained from a semi-crystalline sample;
  b) extracting one or more azimuthal intensity distributions from said diffraction images;
  c) determining the position of one or more intensity peaks in the diffraction azimuthal intensity distributions, said position specified by an azimuthal angle; and
  d) determining the internal strain orientations and/or the internal strain levels of at least a region of the sample based on the position of said intensity peak(s).

The invention claimed is:

1. An X-ray diffraction method for the analysis of amorphous and/or semi-crystalline materials, the method comprising:

a) providing a sample, wherein the sample is a semi-crystalline material or an amorphous material, said material comprising at least one amorphous region;

b) providing a polychromatic X-ray source;

c) collimating X-rays from the X-ray source into one or more pencil beams;

d) exposing at least a region of the sample to the one or more pencil beams, whereby the beam(s) are diffracted;

e) collecting at least some of the diffracted beams in one or more energy dispersive 2D detectors to obtain one or more diffraction images; and f) analyzing the obtained diffraction image(s) to deduce depth information of the sample;

g) determining a magnitude of an internal strain and/or internal stress by correlating with the depth information in at least the exposed region of the sample, the analysis comprises extracting one or more diffraction patterns from the diffraction image(s) and correlating a position of one or more intensity peaks in the diffraction patterns with bond lengths in the exposed region of the sample, wherein said analysis comprises analyzing diffraction signal from the amorphous region of the sample, and wherein no external strain or stress is applied to the sample.

2. The method according to claim 1, wherein the crystallinity of the analyzing material is less than 80%.

3. The method according to claim 1, wherein the material is a semi-crystalline polymer.

4. The method according to claim 1, wherein the one or more energy dispersive 2D detectors comprise a 2-dimensional grid of pixels, or a rectangular grid.

5. The method according to claim 1, wherein an optical element is provided in the beam path, said optical element configured to block a part of the diffracted beams.

6. The method according to claim 5, wherein the optical element is configured to block approximately half of the diffracted X-rays.

7. The method according to claim 5, wherein the optical element is configured to block a selected subset of the diffracted beams, said beams having a scattering angle larger than 0°, and wherein the subset correlates with the position of the optical element, such that the subset can be selected by translating the optical element axially along the beam path.

8. The method according to claim 5, wherein the optical element is displaced along the optical axis in a series of diffraction measurements, wherein the diffracted signal is imaged for each position of the optical element.

9. The method according to claim 7, wherein a computer-implemented algorithm is used to analyze the obtained diffraction images to deduce depth information of the sample, said depth information relating to the internal strain and/or internal stress in the sample.

10. The method according to claim 1, wherein the analysis comprises determining the position of one or more intensity peaks in the diffraction image(s) and/or in 1D diffraction pattern (s) obtained from said image(s);

comparing said positions to a reference sample; and determining the internal strain of the analyzing sample based on said comparison.

11. The method according to claim 1, wherein at least two separate regions of the sample are exposed, and wherein at least one diffraction image is obtained for each of said regions.

12. The method according to claim 11, wherein the analysis further comprises:

obtaining one or more 1D diffraction patterns from the diffraction images;

determining the position of one or more intensity peaks in the 1D diffraction patterns;

determining the difference(s) between the position of similar peaks obtained in different regions of the sample in order to provide a relative strain map of the sample.

13. The method according to claim 12, wherein the intensity peaks comprise a first diffraction peak (FDP) and/or a second diffraction peak (SDP).

14. The method according to claim 1, wherein the analysis comprises:

determining the position of one or more intensity peaks in the azimuthal intensity distribution of one or more diffraction rings formed on the diffraction image(s).

15. The method according to claim 14, wherein the position of the intensity peaks, said position specified by the azimuthal angle, is used to determine the internal strain orientations in the exposed region of the sample.

16. A computer-implemented method for analyzing X-ray diffraction images of semi-crystalline materials, the method comprising:

providing a plurality of X-ray diffraction images obtained from a semi-crystalline sample with no external strain applied thereto;

extracting one or more diffraction patterns from said diffraction images;

determining a position of one or more intensity peaks in the diffraction patterns;

comparing said position(s) to similar intensity peaks obtained at a different strain level or obtained in another region of the sample, wherein the difference(s) between the position(s) of the peaks are computed; and determining a magnitude of an internal strain in at least one region of the sample based on said difference(s) and by correlating the position of one or more intensity peaks in the diffraction patterns with bond lengths in an exposed region of the sample.

17. The method according to claim 16, wherein the X-ray diffraction images are obtained from at least two separate regions of the sample.

18. The method according to claim 16, wherein the X-ray diffraction images are obtained from an amorphous region of the sample.

19. A computer-implemented method for analyzing X-ray diffraction images of semi-crystalline materials, the method comprising:

providing one or more X-ray diffraction images obtained from a semi-crystalline sample;

extracting one or more azimuthal intensity distributions from said diffraction images;

determining the position of one or more intensity peaks in the diffraction azimuthal intensity distributions, said position specified by an azimuthal angle; and determining a magnitude of an internal strain orientations and/or the internal strain levels of at least a region of the sample based on the position of said intensity peak(s), the analysis comprises correlating the position of one or more intensity peaks in said azimuthal intensity distributions with bond lengths in an exposed region of the sample, and wherein no external strain or stress is applied to the sample.

20. An X-ray diffraction method for the analysis of amorphous and/or semi-crystalline materials, the method comprising:

a) providing a sample, wherein the sample is a semi-crystalline material or an amorphous material, said material comprising at least one amorphous region;

b) providing a polychromatic X-ray source;

c) collimating X-rays from the X-ray source into one or more pencil beams;

d) exposing at least a region of the sample to the one or more pencil beams, whereby the beam(s) are diffracted;

e) collecting at least some of the diffracted beams in one or more energy dispersive 2D detectors to obtain one or more diffraction images; and f) analyzing the obtained diffraction image(s) to determine positions of intensity peaks in the diffraction images;

g) determining a magnitude of an internal strain and/or internal stress by correlating with the positions of intensity peaks in at least the exposed region of the sample, wherein said analysis comprises extracting one or more diffraction patterns from the diffraction image(s) and correlating a position of one or more intensity peaks in said diffraction patterns with bond lengths in the exposed region of the sample, wherein said analysis comprises analyzing diffraction signal from the amorphous region of the sample, and wherein no external strain or stress is applied to the sample.

21. An X-ray diffraction method for the analysis of amorphous and/or semi-crystalline materials, the method comprising:

a) providing a sample, wherein the sample is a semi-crystalline material or an amorphous material, said material comprising at least one amorphous region;

b) providing a polychromatic X-ray source;

c) collimating X-rays from the X-ray source into one or more pencil beams;

d) exposing at least a region of the sample to the one or more pencil beams, whereby the beam(s) are diffracted;

e) collecting at least some of the diffracted beams in one or more energy-dispersive 2D detectors to obtain one or more diffraction images;

f) analyzing the obtained diffraction image(s) to deduce depth information of the sample;

g) determining a magnitude and orientation of an internal strain and/or internal stress by correlating with the depth information in at least the exposed region of the sample, wherein said analysis comprises:

i. extracting one or more diffraction patterns from the diffraction image(s);

ii. correlating a position of one or more intensity peaks in said diffraction patterns with bond lengths in the exposed region of the material; and iii. correlating an azimuthal distribution of the intensity of said one or more peaks with an angular distribution of bonds in the exposed region of the material.

\* \* \* \* \*